(12) United States Patent
Lee et al.

(10) Patent No.: US 11,570,514 B2
(45) Date of Patent: Jan. 31, 2023

(54) ELECTRONIC DEVICE AND METHOD OF OPERATING THE SAME

(71) Applicant: SAMSUNG ELECTRONICS CO., LTD., Suwon-si (KR)

(72) Inventors: Jongin Lee, Suwon-si (KR); Kilsoo Choi, Suwon-si (KR); Sehyun Kim, Suwon-si (KR); Kwansik Yang, Suwon-si (KR); Jaesoon Lee, Suwon-si (KR); Dahee Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/133,117

(22) Filed: Dec. 23, 2020

(65) Prior Publication Data

US 2021/0195285 A1 Jun. 24, 2021

(30) Foreign Application Priority Data

Dec. 23, 2019 (KR) ........................ 10-2019-0173468

(51) Int. Cl.
*H04N 21/442* (2011.01)
*H04N 21/431* (2011.01)
(Continued)

(52) U.S. Cl.
CPC ..... *H04N 21/4424* (2013.01); *H04N 21/4316* (2013.01); *H04N 21/44029* (2013.01); *H04N 21/4622* (2013.01); *H04N 21/4858* (2013.01)

(58) Field of Classification Search
CPC ........... H04N 21/4424; H04N 21/4316; H04N 21/44029; H04N 21/4622; H04N 21/4858;
(Continued)

(56) References Cited

U.S. PATENT DOCUMENTS 7,133,408 B1 * 11/2006 Ruberg .............. H04N 21/4344
370/535
8,116,754 B2 2/2012 Kim et al.
(Continued)

FOREIGN PATENT DOCUMENTS

EP 3 410 754 A1 12/2018
KR 10-1264318 B1 5/2013

OTHER PUBLICATIONS

Communication dated Apr. 9, 2021, from the European Patent Office in European Application No. 20216625.2.
(Continued)

*Primary Examiner* — John R Schnurr
(74) *Attorney, Agent, or Firm* — Sughrue Mion, PLLC

(57) ABSTRACT

An electronic device includes a display, a communication interface, a memory storing one or more instructions, and a processor. The processor, by executing the one or more instructions, is configured to, receive a user input for processing a second content while displaying a first content image on the display by processing a first content, identify whether a resource is available for processing the first content and the second content in the electronic device, based on the resource for processing the first content and the second content being unavailable in the electronic device, identify a peer device which has available resource to process the second content, transmit a request for processing the second content to the peer device, receive, through streaming, result second content which results from processing the second content by the peer device, from the peer device, and display, in addition to the first content image, a second content image corresponding to the result second content, on the display.

18 Claims, 17 Drawing Sheets

(51) Int. Cl.
  *H04N 21/4402* (2011.01)
  *H04N 21/462* (2011.01)
  *H04N 21/485* (2011.01)

(58) Field of Classification Search
  CPC .......... H04N 21/23103; H04L 67/1074; H04L 67/1068; H04L 67/1095; H04L 67/327
  See application file for complete search history.

(56) References Cited

U.S. PATENT DOCUMENTS

| | | | | |
|---|---|---|---|---|
| 11,012,756 | B2* | 5/2021 | Garner | H04N 5/50 |
| 2006/0206565 | A1* | 9/2006 | Ganesan | H04N 21/632 |
| | | | | 709/204 |
| 2009/0158325 | A1 | 6/2009 | Johnson | |
| 2009/0254600 | A1* | 10/2009 | Lee | H04N 21/43615 |
| | | | | 709/201 |
| 2011/0119719 | A1* | 5/2011 | Morzos | H04N 21/4622 |
| | | | | 725/85 |
| 2013/0091527 | A1* | 4/2013 | Ho | H04N 21/4316 |
| | | | | 725/81 |
| 2015/0089536 | A1* | 3/2015 | Byerley | H04N 21/4532 |
| | | | | 725/28 |
| 2015/0195478 | A1* | 7/2015 | Hieb | H04H 40/90 |
| | | | | 348/731 |
| 2017/0150227 | A1* | 5/2017 | Kim | H04N 21/4415 |
| 2017/0264947 | A1* | 9/2017 | Gerhards | H04N 21/6143 |
| 2017/0286913 | A1 | 10/2017 | Liu et al. | |
| 2019/0196717 | A1 | 6/2019 | Prestigiacomo et al. | |
| 2019/0320219 | A1* | 10/2019 | Yoden | H04N 21/43615 |
| 2019/0342362 | A1 | 11/2019 | Vysotsky et al. | |
| 2021/0160563 | A1* | 5/2021 | Nayak | H04N 21/43637 |

OTHER PUBLICATIONS

International Search Report (PCT/ISA/210) and Written Opinion (PCT/ISA/237) issued by the International Searching Authority in International Application No. PCT/KR2020/018942, dated Mar. 11, 2021.

Sahar Idwan et al., "Achieving extended displays prototype via Wi-Fi direct technology", IEEE, In: 2014 11th Annual High Capacity Optical Networks and Emerging/Enabling Technologies (Photonics for Energy), Feb. 5, 2015, sections 3, 5; and figure 3, pp. 1-8 (8 pages total).

Sulochan Naik et al., "Implementation of Two Source Wi-Fi Display on a Single Sink Supporting Multiwindow: A New Mode of Infotainment", In: 2018 IEEE 20th International Conference on High Performance Computing and Communications, IEEE 16th International Conference on Smart City, IEEE 4th International Conference on Data Science and Systems (HPCC/SmartCity/DSS), Jan. 24, 2019, sections 4-6, pp. 1-5 (5 pages total).

* cited by examiner

ELECTRONIC DEVICE AND METHOD OF OPERATING THE SAME

CROSS-REFERENCE TO RELATED APPLICATION(S)

This application is based on and claims priority under 35 U.S.C. § 119 to Korean Patent Application No. 10-2019-0173468, filed on Dec. 23, 2019, in the Korean Intellectual Property Office, the disclosure of which is incorporated by reference herein in its entirety.

BACKGROUND

1. Field

The disclosure relates to an electronic device and a method of operating the electronic device, and more particularly, to an electronic device capable of providing a requested function after searching for resources from surroundings even when resources necessary for the electronic device to execute the requested function are insufficient, and a method of operating the electronic device.

2. Description of Related Art

The demand for high-resolution and high-quality images has been increasing. Sizes of displays such as smartphones, televisions (TVs), monitors, etc., preferred by consumers are increasing, and moreover, as personal media centered on photos and videos are spreading, users desire to enjoy clear and high-quality images. Accordingly, there is an increasing demand for images of 8K (7680×4320) resolution, in addition to Full high-definition (FHD) (1920×1080) and Ultra high-definition (UHD) (3840×2160).

Further, in a multi-view screen service that outputs multiple screens from one device, in order to play high-quality images on respective screens included in the multi-view screen, codecs numbering as many as the number of screens may be necessary.

In addition, in an existing artificial intelligence (AI) service, when information collected by a terminal is transmitted to a network, a large-capacity server analyzes the information and sends a result to the terminal. Such a cloud-based AI is less effective when a communication state is poor, and there is a possibility that privacy leakage may occur during transmission of personal information to the server. Thus, demand for an on-device AI that performs AI functions on the terminal itself has been increasing. In such an on-device AI as above, the terminal itself performs the AI functions without using the network, and thus, the terminal requires much more resources as compared with the existing AI service.

As described above, cases of requiring high-performance system resources in a user terminal are increasing, e.g., high-quality multimedia reproduction, the on-device AI, three-dimensional (3D) games, etc. Accordingly, there are increasing cases in which an up-to-date service might not be operational or multi-tasking might not be supported in the user terminal because the resources for executing a certain function are insufficient.

SUMMARY

Provided is an electronic device capable of providing a user with a certain function by using resources from peer devices, even in a case in which a resource for the electronic device to execute the certain function is insufficient when the certain function is to be executed in the electronic device, and a method of operating the electronic device.

Additional aspects will be set forth in part in the description which follows and, in part, will be apparent from the description, or may be learned by practice of the presented embodiments of the disclosure.

In accordance with an aspect of an embodiment, an electronic device includes a communication interface, a memory storing one or more instructions, and a processor configured to execute the one or more instructions stored in the memory, wherein the processor is further configured to execute the one or more instructions to, based on receiving a request for execution of a function, select a peer device capable of executing the function among one or more peer devices, transmit the request for execution of the function to the selected peer device, and receive, from the peer device, result content corresponding to a result of the execution of the function through mirroring and display the result content on the display.

The processor may be further configured to execute the one or more instructions to, when receiving the request for execution of the function while content is being displayed in a first window of the display, generate a second window for displaying the result content corresponding to the result of executing the function received through the mirroring, in addition to the first window, and display the result content in the second window to provide a multi-window screen.

The processor may be further configured to execute the one or more instructions to, according to a request for termination of one of the first window or the second window, re-select a device for providing execution of the function in one window, which is not terminated, by re-evaluating the electronic device and the one or more peer devices for providing the function being executed on one window that is not terminated.

The processor may be further configured to execute the one or more instructions to, according to the request for execution of the function, transmit a resource inquiry message to the one or more peer devices for inquiring whether execution of the function is possible, receive resource response messages from the one or more peer devices according to the resource inquiry message, and select a peer device that is to perform execution of the function among the one or more peer devices that sent the resource response messages.

The processor may be further configured to execute the one or more instructions to generate the resource inquiry message including a resource list including one or more resources required to execute the function, information about the requested function, and a result transfer method.

The processor may be further configured to execute the one or more instructions to receive the resource response message from the one or more peer devices as a response to the resource inquiry message, the resource response message including at least one of whether the requested function is possible to execute, whether to transfer the result, or a busy state of a corresponding peer device.

The processor may be further configured to execute the one or more instructions to select the peer device taking into account the busy state, among the peer devices indicating that the requested function is possible to be executed and the result is possible to be transferred among the one or more peer devices that sent the resource response messages.

The processor may be further configured to execute the one or more instructions to re-select the peer device by re-evaluating the one or more peer devices regularly or based on an occurrence of a preset event.

The preset event may include an event of detecting that a performance of a mirroring result received from the selected peer device is equal to or less than a threshold value, or an event of indicating one window is terminated on a multi-window screen including a plurality of windows.

The request for execution of the function may include information about the function to be executed, information about content to be executed, and setting information of the electronic device.

The processor may be further configured to execute the one or more instructions to display result content corresponding to a result of executing the function received through the mirroring on the display, when receiving a user control operation for controlling displayed content, transmit a control signal corresponding to the user control operation to the peer device, and receive a result of a control operation performed according to the control signal from the peer device.

In accordance with an aspect of an embodiment of the disclosure, a method of operating an electronic device includes, based on receiving a request for execution of a function, selecting a peer device capable of executing the function among one or more peer devices; transmitting the request for execution of the function to the selected peer device, and receiving and displaying, from the peer device, result content corresponding to a result of the execution of the function through mirroring.

In accordance with an aspect of an embodiment of the disclosure, provided is a non-transitory computer-readable recording medium having embodied thereon a program for executing a method of operating an electronic device, wherein the method includes, based on receiving a request for execution of a function, selecting a peer device capable of executing the function among one or more peer devices, transmitting the request for execution of the function to the selected peer device, and receiving and displaying, from the peer device, result content corresponding to a result of the execution of the function through mirroring.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
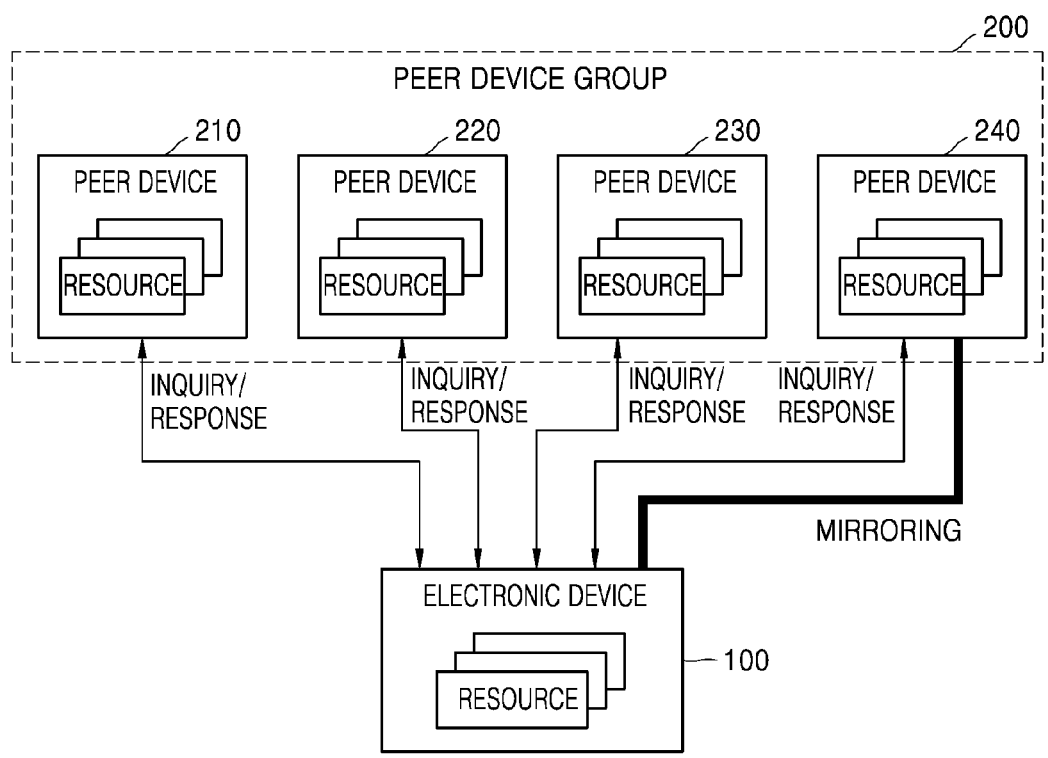
FIG. 1 is a reference diagram for illustrating a concept of a method of providing a result of executing a function in an electronic device by using resources of peer devices, according to an embodiment.

The terminology used herein will be described briefly, and the disclosure will be described in detail.

All terms including descriptive or technical terms which are used herein should be construed as having meanings that are obvious to one of ordinary skill in the art. However, the terms may have different meanings according to an intention of one of ordinary skill in the art, precedent cases, or the appearance of new technologies. Also, some terms may be arbitrarily selected by the applicant. In this case, the meaning of the selected terms will be described in the detailed description. Thus, the terms used herein have to be defined based on the meaning of the terms together with the description throughout the specification.

It will be further understood that the terms "comprises" and/or "comprising," when used in this specification, specify the presence of stated components, but do not preclude the presence or addition of one or more components. In addition, the terms such as " . . . unit", "module", etc. provided herein indicates a unit performing at least one function or operation, and may be realized by hardware, software, or a combination of hardware and software.

Hereinafter, certain embodiments will be described in detail with reference to accompanying drawings to the extent that one of ordinary skill in the art would be able to carry out the disclosure. However, the disclosure may be implemented in various manners, and is not limited to embodiments described herein. In addition, components irrelevant with the description are omitted in the drawings for clear description, and like reference numerals are used for similar components throughout the entire specification.

Throughout the disclosure, the expression "at least one of a, b or c" indicates only a, only b, only c, both a and b, both a and c, both b and c, all of a, b, and c, or variations thereof.

As used herein, the term "user" denotes a person controlling functions or operations of an image display apparatus by using a control device, and may include a viewer, a manager, or an installation technician.

FIG. 1 is a reference diagram for illustrating a concept of a method of providing a result of executing a function in an electronic device 100 by using resources of peer devices, according to an embodiment.

Referring to FIG. 1, a system includes the electronic device 100 and a peer device group 200, and the peer device group 200 may include one or more peer devices, that is, a first peer device 210, a second peer device 220, a third peer device 230, and a fourth peer device 240.

The electronic device 100 includes a processor and a memory, executes functions by using one or more resources, and may be referred to as a computing device. The electronic device 100 may include, for example, a television, a set-top box, a digital video recorder (DVR), a receiver or a similar customer premise equipment (CPE), a personal computer, a personal portable terminal, a smartphone, an electronic notebook, a laptop, a wearable device, etc. When receiving a function execution request from the user, the electronic device 100 may execute the function by using one or more resources that the electronic device 100 has. A resource may denote, for example, hardware or software required for the electronic device 100 to execute requested function, and may include, for example, a decoder, a memory, a processor, a display, an application, etc. For example, the function may include an operation to process a content or an operation to reproduce the content. The operation to process the content includes, for example, at least one of decoding, scaling, or rendering the content.

Each peer device includes a processor and a memory, executes functions by using one or more resources, and may be referred to as a computing device. The peer devices may include, for example, a television, a set-top box, a digital video recorder (DVR), a receiver or a similar customer premise equipment (CPE), a personal computer, a personal portable terminal, a smartphone, etc.

Each of the first, second, third, and fourth peer devices 210, 220, 230, and 240 included in the peer device group 200 may execute a function by using a resource of its own.

The electronic device 100 may communicate with each peer device in the peer device group 200 via a network. A network through which the electronic device 100 and the peer devices communicate may include various communication networks such as 5G network, Wi-Fi, Wi-Fi direct, BLE, etc.

According to an embodiment, the electronic device 100 receives a request for execution of a function, and when it is determined that the requested function might not be executed by using resources in the electronic device 100, the electronic device 100 may select a peer device capable of executing the function among one or more peer devices. For example, in the system shown in FIG. 1, the electronic device 100 may send inquiry messages to the first, second, third, and fourth peer devices 210, 220, 230, and 240 for inquiring whether the requested function may be executed, and receive response messages from the first, second, third, and fourth peer devices 210, 220, 230, and 240 to select a peer device that is to execute the function. When finishing the selection of the peer device, the electronic device 100 sends a request for execution of the function to the selected peer device and may receive a result of the execution from the peer device through mirroring. Therefore, even when there is no resource or insufficient resource for executing the requested function, the electronic device 100 may communicate with peer devices, select a peer device to execute the requested function to make the selected peer device execute the requested function on the behalf of the electronic device 100, and then, receive the execution result through the mirroring and provide the user with the result. Thus, the function requested by the user may be provided through the electronic device 100. The electronic device 100 receives and displays content from the selected peer device, and the selected peer device provides the electronic device 100 with the content to be displayed. In this point of view, the electronic device may be referred to as a sink device and the selected peer device may be referred to as a source device.

A resource executing the function may denote, for example, hardware or software for the electronic device 100 to execute requested function, and may include, for example, a decoder, a memory, a processor, a display, an application, etc. A decoder may include a codec for decoding video data, for example, H.264, H.265, VP8, VP9, WMV, DivX, etc., and a codec for decoding audio data, for example, AAC, DTS, MP3, EAC3, etc. The memory may include SDRAM, etc., and SDRAMs of various capacities may be used. A processor may include a central processing unit (CPU), a neural processing unit (NPU), a graphics processing unit (GPU), etc.

For example, the electronic device 100 includes one codec capable of processing a 4K image. When receiving a request for execution of another 4K image while processing and displaying a current 4K image on a screen, the electronic device 100 might not execute another 4K image by itself because the electronic device 100 includes only one codec for processing the 4K image. In this case, the electronic device 100 searches for a peer device to process another 4K image, and allows the found peer device to execute processing of another 4K image and receives processed result through mirroring. Thus, the electronic device 100 may display another 4K image, in addition to the currently displayed 4K image. Here, the electronic device 100 may use a multi-view or multi-window for simultaneously displaying the currently displayed 4K and another 4K image.

For example, the electronic device 100 includes one codec for processing a 4K image. When receiving a request for execution of an 8K image, the electronic device 100 searches for a peer device to execute the 8K image, allows the found peer device to perform execution of the 8K image, and receives execution result through the mirroring to display the 8K image.

According to an embodiment, according to a request for execution of a function, the electronic device 100 transmits inquiry messages to one or more peer devices for inquiring whether the execution of the function is possible, receives response messages from one or more peer devices, and may select a peer device capable of executing the function among one or more peer devices sending the response messages.

According to an embodiment, the electronic device 100 identifies one or more resources that are required to execute the requested function, and then may generate an inquiry message including a resource list including one or more resources required to execute the function, information about the function that is requested to be executed, and a result transmitting method.

The electronic device 100 may receive the response messages, from one or more peer devices, each including whether the requested function may be executed, whether the result may be transferred, or a busy state of the corresponding peer device as responses to the inquiry message.

According to an embodiment, among the one or more peer devices that sent the response messages, the electronic device 100 may select a peer device considering the busy state among the peer devices that sent the response messages indicating that the requested function may be executed and the result may be transferred.

According to an embodiment, when sending a request for execution of the function to the selected peer device, the electronic device 100 may send a resource inquiry message including information about the function to be executed, information about content to be executed, and setting information of the electronic device.

According to an embodiment, when performance of the function execution result received from the selected peer device through mirroring degrades, the electronic device 100 may re-evaluate one or more peer devices to re-select a peer device that is to execute the function on behalf of itself. For example, the electronic device 100 may receive and display a 4K image decoding result from the fourth peer device 240 that is initially selected through mirroring. However, when a user of the fourth peer device 240 is to execute another function or executes another function by using the fourth peer device 240, the processing performance of the fourth peer device 240 may degrade. Alternatively, when the user of the fourth peer device 240 leaves a certain space by carrying away the fourth peer device 240, a data reception performance from the fourth peer device 240 may degrade as the distance becomes greater. Therefore, the electronic device 100 monitors the reception result from the fourth peer device 240 that is initially selected through mirroring, and when it is determined that there is degradation of the performance as a result of monitoring, the electronic device 100 may re-evaluate the peer devices to select a new peer device.

According to an embodiment, when the peer device that is to execute the function is changed from the initially selected peer device to a re-selected peer device, the electronic device 100 may provide the re-selected peer device with information about processing degree of the function executed in the initially selected peer device to guarantee seamless mirroring result. For example, when the quality of the image received from the initially selected peer device degrades while the electronic device receives and displays up to 35 minutes of the image from the initially selected peer device, the electronic device 100 re-selects a peer device for executing the image and allows the re-selected peer device to execute the corresponding image. Here, the initially selected peer device provides the re-selected peer device with information about decoding processed degree, such that the re-selected peer device may start the decoding process with reference to the decoding processed degree in the initially selected peer device. Therefore, the electronic device 100 may display the image seamlessly even when the device decoding the image is switched in the middle.

According to an embodiment, the electronic device 100 displays result content of the execution of the function received through mirroring on a display. In addition, on receiving a user interface controlling operation for controlling the displayed content, the electronic device 100 transmits a control signal corresponding to the received user interface controlling operation to the peer device and receives a control result executed according to the control signal from the peer device. For example, when the electronic device 100 receives and displays the function executing result from the fourth peer device 240 through mirroring, execution and controlling authority of the corresponding function belongs to the fourth peer device 240 and the electronic device 100 only receives and displays the result. However, the user generally watches the image or the result through the electronic device 100, the user may want to perform the controlling operation by using the electronic device 100. For example, when the electronic device 100 receives and displays a result of screen on which YouTube application is executed from the fourth peer device 240 through mirroring and the user wants to perform a user control operation on the YouTube executing screen, e.g., to stop playing the corresponding image or to play another image, the user may instruct a user input for controlling the electronic device 100. In this case, the electronic device 100 may transmit a control signal corresponding to the user control operation to the peer device via a user input back channel (UIBC), etc., and then the peer device may perform the control operation corresponding to the control signal. In addition, due to the mirroring, the control operation performing result may be transmitted from the peer device to the electronic device 100 through mirroring.

According to an embodiment, when receiving a request for execution of a function in a state in which the content is being displayed in a single first window, the electronic device 100 may generate a second window for displaying the content of function execution result received through the mirroring, in addition to the first window, and may display the result content in the second window to provide a multi-window screen. For example, when receiving a request for display of yoga content from the user while displaying news content in a single window, the electronic device 100 might not additionally execute the yoga content. Here, the electronic device 100 may delegate the execution of the yoga content to the peer device, and then, the electronic device 100 converts the screen into the multi-window screen by additionally arranging a second window in addition to the original window and may display a result of the yoga content execution result received from the peer device through mirroring in the second window.

According to an embodiment, according to a request for termination of one of the first window or the second window, the electronic device 100 may re-evaluate the electronic device and one or more peer devices for providing the function being executed on one window that is not terminated, so as to select the peer device to execute the function corresponding to the one window that is not terminated. For example, in the above example, the electronic device 100 is displaying the new content executed by the electronic device 100 in the first window and is displaying the yoga content executed by the peer device in the second window. At this time, when there is a request for termination of the new content that is being displayed in the first window, the electronic device 100 terminates the first window displaying the news content and displays the single screen of the second window. However, because the second window displays the yoga content received from the peer device through the mirroring, the resource of the electronic device 100 is not being used. In this case, it may be better in view of performance to execute the yoga content using its own resource of the electronic device 100 than to receive the yoga content through mirroring. Therefore, in order to determine which is better among cases in which the yoga content is executed by the electronic device 100 itself, the yoga content is executed in the current peer device, and whether there is another peer device having superior performance to that of the current peer device, the electronic device 100 re-evaluates the electronic device 100 and one or more peer devices to select a device, that is, the electronic device or the peer device, to execute the function corresponding to the content that is to be displayed in the window that is not terminated.

Figure 2:
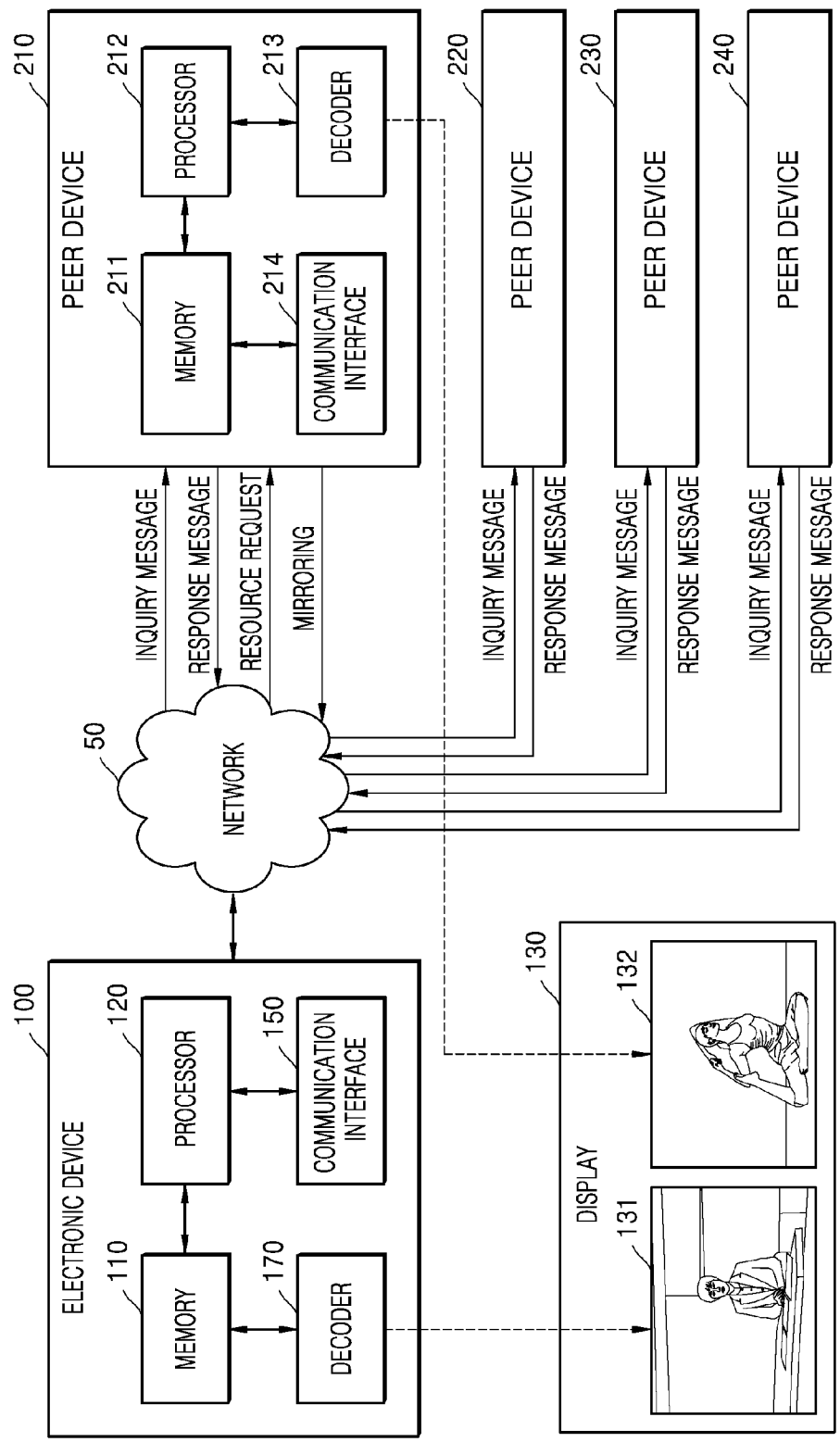
FIG. 2 is a diagram showing an example of a system for providing a result of executing a function in an electronic device by using resources of peer devices, according to an embodiment.

FIG. 2 is a diagram showing an example of a system for providing a function execution result in an electronic device by using resources of peer devices, according to an embodiment.

Referring to FIG. 2, the system may include the electronic device 100, the network 50, and the peer device group 200.

The electronic device 100 and the peer device group 200 may communicate with each other via a wireless access network that is directly or indirectly coupled to a packet network. The electronic device 100 may be connected to one or more peer devices in the peer device group, based on wireless communication, e.g., Bluetooth, Bluetooth low energy (BLE), Wi-Fi, etc.

According to an embodiment, the electronic device 100 may include a memory 110, a processor 120, a decoder 170, and a communication interface 150.

The memory 110 according to an embodiment may store programs for processing and controlling the processor 120, and may store data input to or output from the electronic device 100. The memory 110 may include a storage medium of at least one type of a flash memory type, a hard disk type, a multimedia card micro type, a card type memory (e.g., an SD or XD memory, etc.), random access memory (RAM), a static RAM (SRAM), a read-only memory (ROM), an electrically erasable programmable ROM (EEPROM), a programmable (PROM), a magnetic memory, a magnetic disk, and an optical disk.

The communication interface 150 may connect the electronic device 100 to one or more peer devices of the peer device group 200 according to control of the processor 120.

The communication interface 150 may include a combination of one or more from a wireless LAN module, Bluetooth module, and wired Ethernet module, in correspondence with the performance and structure of the electronic device 100. The communication interface 150 may further include another near field communication module (e.g., near field communication (NFC), BLE, etc.) in addition to the Bluetooth.

The decoder 170 may decode data stored in the memory 110 or data received through the communication interface 150 according to control of the processor 120. For example, the decoder 170 may include one or more resources among MPEG1, MPEG2, H.264, H.265, MOV, WMV/WMA, DivX, Xvid, and AAC according to the specification of the electronic device 100.

In the example of FIG. 2, the electronic device 100 may include a display to directly output data processed by the processor 120 on the display, or the electronic device 100 may transfer the data processed by the processor 120 to a display device electrically connected thereto via the communication interface 150.

The processor 120 according to an embodiment controls overall operations of the electronic device 100. For example, the processor 120 executes one or more instructions stored in the memory 110 to perform the functions of the electronic device 100 illustrated with reference to FIGS. 1 to 17.

According to an embodiment, when there is a request for execution of the function, the processor 120 checks one or more resources to execute the requested function and may determine whether the electronic device 100 includes the one or more resources required to execute the requested function. For example, in a state in which the electronic device 100 includes one decoder for decoding a 4K image, when receiving a request for play of an 8K image, the processor 120 may determine that the resources required to execute the requested function are insufficient. Alternatively, while the electronic device 100 plays the 4K image by using the decoder for decoding the 4K image, when receiving an additional request for play of another 4K image, the processor 120 may determine that the resources required to execute the requested function are insufficient.

According to an embodiment, when it is determined that the resources required to execute the requested function are insufficient, the processor 120 may make an inquiry to check whether peer devices may provide the required resources. For example, the processor 120 may check one or more resources required to the requested function, and may generate a list of one or more resources.

According to an embodiment, the processor 120 may generate an inquiry message including a resource list including identifiers of the one or more resources required to execute the function, information about the requested function, and a result transfer method, in order to inquire with one or more peer devices whether the execution of the function is possible, and may transfer the inquiry message to one or more peer devices.

According to an embodiment, the peer devices to which the resource inquiry message may be sent from the electronic device 100 may be limited to peer devices which are authenticated in advance. A certain peer device might not want to share the resource of itself with the electronic device 100 even when the peer device is around the electronic device 100, and thus the resource inquiry message is not be transmitted to such above peer device. For example, there may be other devices owned by the user of the electronic device 100 and devices owned by friends or guests of the user of the electronic device 100, and it may be appropriate that the resources shared with the other devices owned by the user of the electronic device 100, but it may be inappropriate to request resources from the devices owned by the friends or guests. Therefore, the peer devices to which the electronic device 100 transmits the resource inquiry message may be limited to the peer devices that have been allowed to share the resources and authenticated.

According to an embodiment, the peer devices to which the electronic device 100 transmits the resource inquiry message may include the peer devices connected through an access point that is the same as that of the electronic device 100.

According to an embodiment, the peer devices to which the electronic device 100 transmits the resource inquiry message may include the peer devices connected through Bluetooth communication, Wi-Fi direct, or near-field communication.

Figure 3:
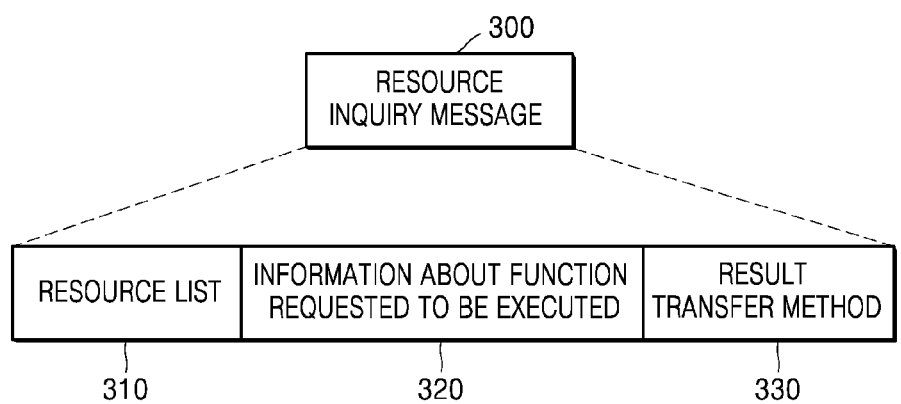
FIG. 3 is a diagram showing an example of a resource inquiry message transmitted from an electronic device to a peer device, according to an embodiment.

FIG. 3 is a diagram showing an example of a resource inquiry message transmitted from an electronic device to a peer device, according to an embodiment.

Referring to FIG. 3, a resource inquiry message 300 may include a resource list 310 including identifiers of one or more resources required to execute a function, information 320 about function requested to be executed, and a result transfer method 330.

The resource list 310 may include identifiers of one or more resources required to execute the function. The one or more resources required to execute the function may be variously determined depending on what is the requested function. For example, when the requested function is reproduction of a 4K image, an identifier of a codec that may decode the 4K image may be included in the resource list 310. For example, when the requested function is reproduction of an 8K image, an identifier of a codec that may decode the 8K image may be included in the resource list 310.

The information 320 about the requested function may include an identifier of the requested function or an identifier of an application that is requested to be executed. For example, when it is requested that a 4K image is played via a certain application, an identifier about the certain application may be included in the resource list.

The result transfer method 330 may include information about a method of transferring a result obtained through the execution of a certain function in the peer device to the electronic device 100. For example, the result transfer method 330 may include a screen mirroring, in which display screen data is transferred so that an execution screen of content decoded by the peer device may be displayed on the screen of the electronic device 100. The result transfer method 330 may include various transfer methods, e.g., Miracast, Air Play, Wireless display (WiDi), screen mirroring method, screen streaming method, etc.

According to an embodiment, the processor 120 may transfer the resource inquiry message to one or more peer devices via broadcasting, etc. The one or more peer devices receiving the resource inquiry message may include neighboring peer devices around the electronic device 100. For example, the electronic device 100 may transfer the resource inquiry message to one or more peer devices using wireless Internet by sharing an access point. For example, the electronic device 100 may transfer the resource inquiry message to one or more peer devices capable of connecting Bluetooth communication using the Bluetooth method.

According to an embodiment, the processor 120 may receive a resource response message 400 from the one or more peer devices as a response to the resource inquiry message sent to the one or more peer devices. The resource response message 400 may include at least one of whether the requested function may be executed, whether the result may be transferred, or a busy state of the device.

Figure 4:
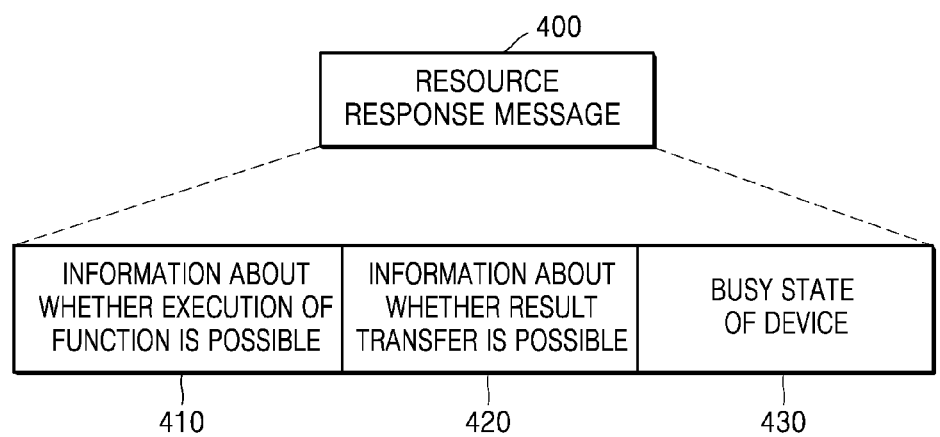
FIG. 4 is a diagram showing an example of a resource response message received by an electronic device from a peer device, according to an embodiment.

FIG. 4 is a diagram showing an example of the resource response message 400 received by the electronic device 100 from a peer device, according to an embodiment.

Referring to FIG. 4, the resource response message 400 may include information 410 about whether the requested function may be executed, information 420 about whether the result may be transferred, and information about a busy state 430 of the device.

The information 410 about whether the requested function may be executed may include information indicating whether the peer device sending the resource response message 400 may execute the function requested to be executed by the electronic device 100. For example, the peer device sending the resource response message 400 checks the resource identifiers in the resource list 310 included in the resource inquiry message 300 and determines whether to include the resources corresponding to the checked resource identifiers. When the peer device includes the resources corresponding to the resource identifiers, the peer device may transmit a resource inquiry message including information indicating the function may be executed, and when the peer device does not include the resources corresponding to the resource identifiers, the peer device may transmit a resource inquiry message including information indicating the function may not be executed. For example, in a case in which the resource list 310 includes a 4K codec, when the peer device includes the 4K codec, the peer device may indicate that the function is executable. In a case in which the resource list 310 includes an 8K codec, when the peer device only includes the 4K codec, the peer device may indicate that the function may not be executable.

The information 420 about whether the peer device sending the resource response message 400 may transfer the result by the result transfer method desired by the electronic device 100. For example, the peer device sending the resource response message 400 checks the method designated in the result transfer method 330 included in the resource inquiry message 300, and when the result may be provided by the result transfer method, the peer device may indicate that the result may be transferred, and when the result cannot be transferred by the result transfer method designated in the resource inquiry message 300, the peer device may indicate that the result cannot be transferred. For example, in a case in which the resource inquiry message 300 includes the result transfer method 330 designated as screen mirroring, when the peer device may transfer the result by the screen mirroring, the peer device may indicate that it is possible to transfer the result, and when the peer device cannot transfer the result by the screen mirroring, the peer device may indicate that it is not possible to transfer the result.

The busy state 430 of the device may include busy state or idle state information of the peer device sending the resource response message 400. The busy state 430 of the device may include information on a degree indicating how the peer device sending the resource response message 400 is busy. For example, the busy state 430 of the device may include may include information on one or more of a CPU usage rate, a GPU usage rate, and a memory usage rate of the corresponding device. When the CPU usage rate, the GPU usage rate, and the memory usage rate are high, it may indicate the corresponding device is busy.

For example, referring to FIG. 2, the electronic device 100 may transmit the resource inquiry message to one or more peer devices, that is, the first, second, third, and fourth peer devices 210, 220, 230, and 240 by using a broadcasting method, and may receive resource response messages from the first, second, third, and fourth peer devices 210, 220, 230, and 240.

According to an embodiment, the electronic device 100 may select one peer device to which the execution of the function is to be delegated, among the one or more peer devices that sent the resource response messages. Here, among the peer devices sending the resource response messages indicating that the requested function is executable and the result may be transferred, based on the received resource response messages, the electronic device 100 may select a least busy peer device as the peer device to which the execution of the function is to be delegated, in consideration of the busy states of the peer devices.

Figure 5:
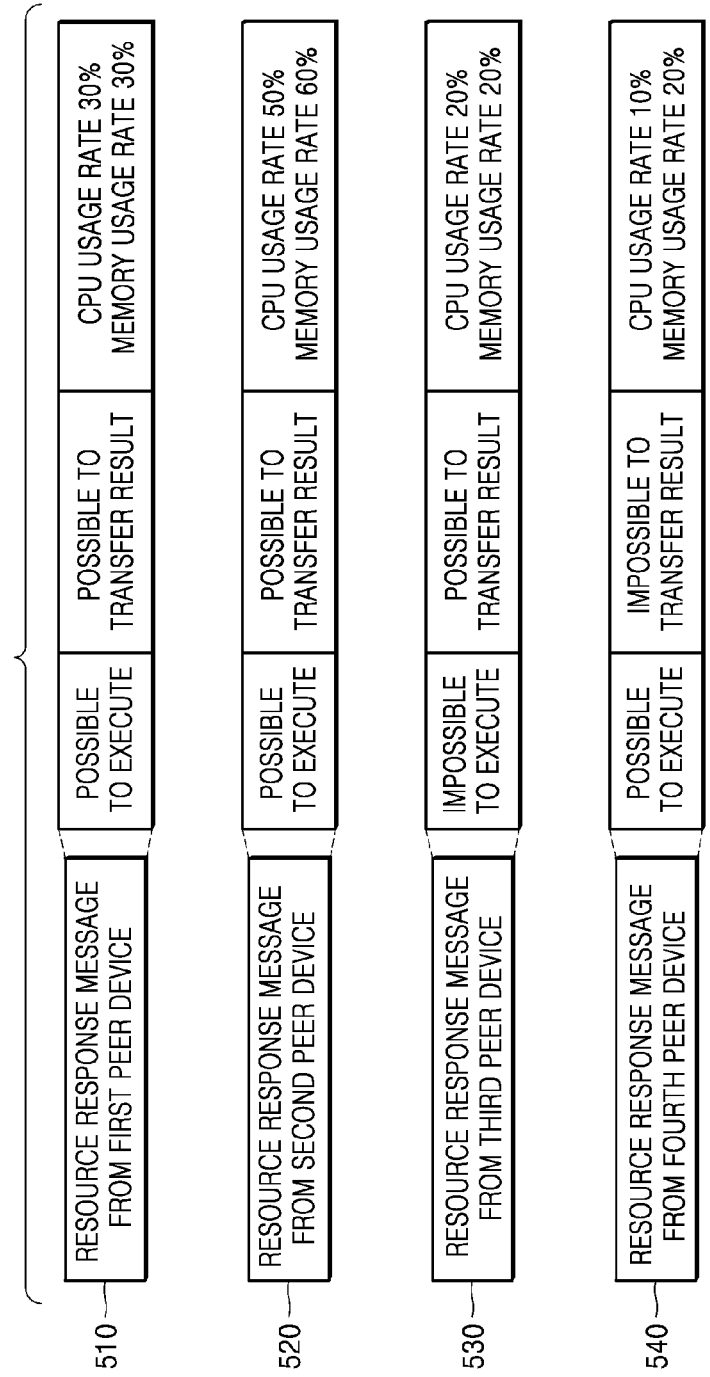
FIG. 5 is a diagram showing examples of resource response messages received by an electronic device, according to an embodiment.

FIG. 5 is a diagram showing examples of resource response messages received by the electronic device 100, according to an embodiment.

Referring to FIG. 5, a resource response message 510 from the first peer device includes 'possible to execute function' as the information about whether the function is executable, 'possible to transfer result' as the information about whether the result may be transferred, and 'CPU usage rate 30%, memory usage rate 30%' as the busy state of the device, and a resource response message 520 of the second peer device includes 'possible to execute function' as the information about whether the function is executable, 'possible to transfer result' as the information about whether the result may be transferred, and 'CPU usage rate 50%, memory usage rate 60%' as the busy state of the device. Also, a resource response message 530 from the third peer device includes 'impossible to execute function' as the information about whether the function is executable, 'possible to transfer result' as the information about whether the result may be transferred, and 'CPU usage rate 20%, memory usage rate 20%' as the busy state of the device, and a resource response message 540 of the fourth peer device includes 'possible to execute function' as the information about whether the function is executable, 'impossible to transfer result' as the information about whether the result may be transferred, and 'CPU usage rate 10%, memory usage rate 20%' as the busy state of the device.

When the electronic device 100 receives the resource response messages as shown in FIG. 5, the electronic device 100 may exclude the third and fourth peer devices from candidate devices to which the execution of the function is to be delegated, because the execution of the function is impossible according to the resource response message from the third peer device and the result transfer is impossible according to the resource response message from the fourth peer device. The electronic device 100 may select a candidate device, to which the execution of the function is to be delegated, between the first and second peer devices indicating that the function execution is possible and the transfer of the result is possible. The electronic device 100 may select, between the first and second peer devices, one peer device that is less busy taking into account the busy state of the device as the candidate device to which the function execution is to be delegated. For example, because the first peer device has less CPU usage rate and less memory usage rate than those of the second device, between the first and second peer devices, the electronic device 100 may determine that the first device is less busy. Therefore, the electronic device 100 may select the first peer device as the peer device to which the function execution is to be delegated.

According to an embodiment, the electronic device 100 may select the peer device to which the function execution is to be delegated, only by considering the information from the resource response messages transmitted from the peer devices. For example, the electronic device 100 may select, among the peer devices indicating that the function execution is possible and the result transfer is possible, a peer device that is less busy in consideration of the busy state of the device as the peer device to which the execution of the function is to be delegated.

According to an embodiment, the electronic device 100 may select the peer device to which the execution of the function is to be delegated by further considering a network speed, in addition to the information included in the resource response messages sent from the peer devices. For example, the electronic device 100 may select, among the peer devices indicating that the function execution is possible and the result transfer is possible, a peer device as the peer device to which the execution of the function is to be delegated in consideration of the busy state of the device and the network speed. For example, in an example shown in FIG. 5, when it is determined that the busy state of the first peer device and the busy state of the second peer device are not significantly different from each other, the electronic device 100 may select the peer device having a faster network speed as the peer device to which the execution of the function is to be delegated by taking into account the network speed of each of the first and second peer devices. For example, when the network speed of the second peer device is much faster than that of the first peer device even though the first peer device is less busy according to the busy state of the first and second peer devices, the electronic device 100 may select the second peer device as the peer device to which the execution of the function is to be delegated. The electronic device 100 may determine network speeds of the peer devices by using a PING test.

The selection of the peer device, to which the electronic device 100 is to delegate the execution of the function, is not limited to the above-described examples, but the peer device may be selected in consideration of various factors. For example, the electronic device 100 may select the peer device, to which the execution of the function is to be delegated, only by taking into account the network speed of the device, not the busy state of the device.

According to an embodiment, when one peer device, to which the execution of the function is to be delegated, is selected among one or more peer devices that have sent the resource response messages in response to the resource inquiry message, the electronic device 100 may transmit the resource request message.

Figure 6:
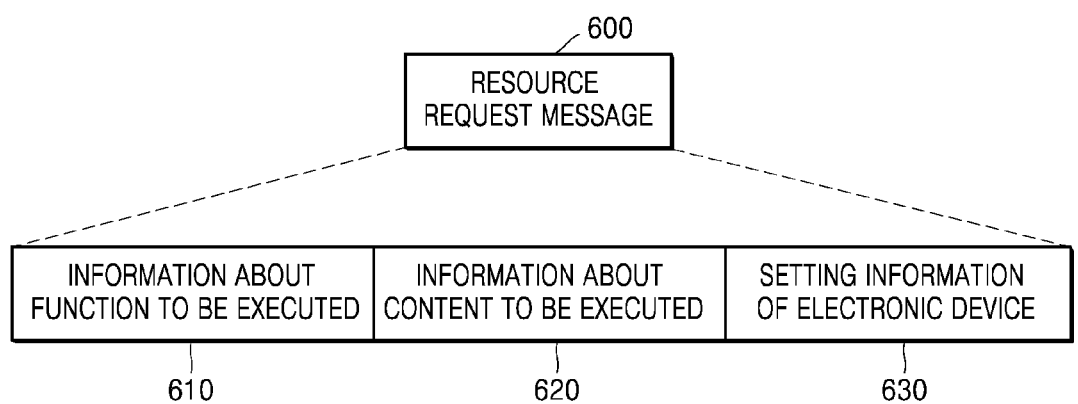
FIG. 6 is a diagram showing an example of a resource request message transmitted from an electronic device to a selected peer device, according to an embodiment.

FIG. 6 is a diagram showing an example of a resource request message 600 transmitted from the electronic device 100 to a selected peer device, according to an embodiment.

Referring to FIG. 6, the resource request message 600 may include information 610 about the function to be executed, information 620 about content to be executed, and setting information 630 of the electronic device.

The information 610 about the function to be executed may include information about the function or an application that the electronic device 100 requests the selected peer device to execute. For example, when certain content is to be executed via a certain content providing application, the information 610 about the function to be executed may include an identifier of the certain content providing application.

The information 620 about the content to be executed may include an identifier for certain content to be executed through a certain content providing application.

In an example, the information 610 about the function to be executed and the information 620 about the content to be executed may be represented by one URL address.

The setting information 630 of the electronic device may include setting information that is required for the peer device to execute the function instead of the electronic device 100 or information required for the peer device to provide the execution result to be suitable for the display of the electronic device 100 when the result is transmitted to the electronic device 100. The setting information 630 of the electronic device may include, for example, account information required to execute the content or the function, resolution information of a window for displaying the content in the electronic device, information about an operating mode (display type) of the window on which the content is to be displayed in the electronic device, UIBC information, etc.

For example, the setting information required for the peer device to execute the function on behalf of the electronic device 100 may include account information or authentication information required to execute a certain application. For example, a content providing application may require account information or authentication information for using the content therein. Therefore, when the account information or the authentication information is provided with the resource request message, the peer device may access the content providing application by using the account information or the authentication information when executing the corresponding function for the electronic device.

For example, the setting information required for the peer device to execute the function on behalf of the electronic device 100 may include resolution information of the window on which the content is to be displayed in the electronic device. Therefore, the peer device may send screen data including content to the electronic device via the screen mirroring after converting or adjusting the screen data to be suitable for the resolution of the window in the electronic device.

For example, the setting information required for the peer device to execute the function on behalf of the electronic device 100 may include information about the operating mode (display type) of the window on which the content is to be displayed in the electronic device. That is, the setting information 630 of the electronic device may include information that is required to provide the result of executing the function in the format suitable for the display of the electronic device 100, when the peer device sends the result to the electronic device 100. The setting information 630 of the electronic device may include operating mode information (horizontal mode/vertical mode) of the window for displaying the content in the electronic device, or display type (horizontal type, vertical type). When the electronic device 100 is used as a multi-view screen, the operating mode information or the display type information may indicate an operating mode of a window through which the content execution result is to be output through the screen mirroring in the multi-view screen. For example, when the electronic device 100 is a television that is generally used in the horizontal mode, the format of the screen displayed on the display of the television may be different from, for example, the screen format generally displayed on a smartphone. For example, the electronic device 100 is a television and the peer device to which the execution of the function is delegated is a smartphone, the screen formation (mobile version content) seen on the smartphone may be different from the screen formation (PC version content) seen on the television even though the content is the same. Therefore, when the actual execution of the content is performed on the smartphone, the user really wants to see the content on the electronic device, and thus, the function may be executed on the smartphone to be suitable for the television screen format and then the result of executing the result may be mirrored to the television. Therefore, the electronic device 100 provides the information about the format of the electronic device 100 (information indicating that the format is the PC version) in the resource request message 600, and thus, the peer device may access and execute the content with reference to the information about the format of the electronic device 100 and then the execution result in the format suitable for the screen of the electronic device 100 may be transferred to the electronic device 100.

The setting information 630 of the electronic device may further include user input back channel (UIBC) information. The UIBC information is used to transfer a content control signal to the peer device, when the electronic device 100 receives the content control signal for controlling the content displayed on the electronic device through mirroring.

According to an embodiment, the processor 120 may receive the function execution result through the screen mirroring from the peer device to which the execution of the function is delegated.

The processor 120 may output the function execution result received through the screen mirroring from the peer device on the display thereof such that the result may be displayed on the display inside the electronic device 100 or a display outside the electronic device 100.

Referring to FIG. 2, for example, the display 130 may display the content decoded by the decoder of the electronic device 100 in a first window 131, and may display the function execution result content received through the screen mirroring from the first peer device 210 by delegating the execution of the function to the first peer device 210 in a second window 132. Therefore, even though the electronic device 100 includes only one decoder, the electronic device 100 may delegate the function execution to the peer device and then receives the result, and thus, two pieces of content may be displayed on the display as if there are two decoders in the electronic device 100.

According to an embodiment, the processor 120 may re-evaluate one or more peer device regularly or whenever a certain event occurs, in order to re-select the peer device for executing the function. For example, the certain event may include an event of sensing degradation in the performance of the mirroring result from the initially selected peer device. As described above, the performance of the mirroring result transmitted from the peer device that is initially set to execute the function may degrade. For example, the first peer device 210 that has executed the function on behalf of the electronic device 100 may be away from the electronic device 100, and then, the network speed is reduced and the performance of the mirroring result may degrade. Alternatively, a user of the first peer device 210 that has executed the function on behalf of the electronic device makes the first peer device 210 do a new task, and then, the memory usage rate or the CPU usage rate of the first peer device 210 may increase and the performance of the mirroring result may degrade. In this case, in order to prevent the performance of the mirroring result from degrading, the electronic device 100 monitors whether the performance of the mirroring result degrades, and when it is detected that the performance of the mirroring result degrades to a threshold value or less as a monitoring result, the electronic device 100 may re-select the peer device to execute the function by considering the event. Alternatively, not by the above certain event, the processor 120 may regularly monitor the performance of the mirroring result, and when the performance of the mirroring result degrades less than a threshold value, the processor 120 may re-select the peer device to execute the function. The re-selection of the peer device to execute the function may be performed by the same method of initially selecting the peer device to execute the function.

According to an embodiment, when the peer device to execute the function is re-selected, the processor 120 may provide the re-selected peer device with the information about a processing degree of the function executed in the initially set peer device for ensuring seamless mirroring result.

According to an embodiment, the processor 120 displays result content of the execution of the function received through mirroring on a display. In addition, on receiving a user control operation input for controlling the displayed content, the processor 120 transmits a control signal corresponding to the received user control operation input to the first peer device 210 and receives a control result executed in the first peer device 210 according to the control signal from the first peer device 210.

The first peer device 210 of FIG. 2 will be described below as an example of a peer device.

According to an embodiment, the first peer device 210 may include a memory 211, a processor 212, a decoder 213, and a communication interface 214.

The memory 211 according to an embodiment may store programs for processing and controlling the processor 212, and may store data input to or output from the first peer device 210. The memory 211 may include a storage medium of at least one type of a flash memory type, a hard disk type, a multimedia card micro type, a card type memory (e.g., an SD or XD memory, etc.), random access memory (RAM), a static RAM (SRAM), a read-only memory (ROM), an electrically erasable programmable ROM (EEPROM), a programmable (PROM), a magnetic memory, a magnetic disk, and an optical disk.

The communication interface 214 may connect the first peer device 210 to the electronic device 100 according to control of the processor 212.

The communication interface 214 may include a combination of one or more from a wireless LAN module, Bluetooth module, and wired Ethernet module, in correspondence with the performance and structure of the first peer device 210. The communication interface 150 may further include another near field communication module (e.g., near field communication (NFC), BLE, etc.) in addition to the Bluetooth.

The decoder 213 may decode data stored in the memory 211 or data received through the communication interface 214 according to control of the processor 212. For example, the decoder 213 may include one or more resources among MPEG1, MPEG2, H.264, H.265, MOV, WMV/WMA, DivX, Xvid, and AAC according to specification of the first peer device 210.

In an example of FIG. 2, the first peer device 210 may include a display to directly output data processed by the processor 212 on the display, or the first peer device 210 may transfer the data processed by the processor 212 to a display device electrically connected thereto via the communication interface 214.

The processor 212 according to an embodiment controls overall operations of the first peer device 210. For example, the processor 212 executes one or more instructions stored in the memory 211 to perform the functions of the first peer device 210 illustrated with reference to FIGS. 1 to 17.

According to an embodiment, when receiving a resource inquiry message from the electronic device 100, the processor 212 determines whether the first peer device 210 may provide the resources required by the electronic device 100 according to the information included in the resource inquiry message and may transmit a resource response message to the electronic device 100. For example, the resource inquiry message received by the first peer device 210 may be an example shown in FIG. 3.

In an example, the processor 212 may determine whether the first peer device 210 includes resources required to execute the function according to the resource list 310 including identifiers of one or more resources required to execute the function included in the resource inquiry message 300. A resource required to execute the function may denote hardware or software for executing requested function in the electronic device 100, and may include, for example, a decoder, a memory, a processor, a display, an application, etc. Therefore, the processor 212 may determine whether the resources requested by the electronic device, e.g., a decoder of a certain specification, a memory of a certain specification, a processor of a certain processor, a display of a certain specification, or an application, may be provided.

According to an example, the processor 212 may determine whether the function requested to be executed from the electronic device 100 may be executed according to the information 320 about the function requested to be executed, which is included in the resource inquiry message 300. For example, when the information 320 about the function requested to be executed from the electronic device 100 includes a certain application, the processor 212 may determine whether the certain application is installed on the first peer device 210. According to an embodiment, even when the certain application is not installed on the first peer device 210, the processor 212 may determine that the certain application may be used provided that it is determined that the installation of the certain application is automatically performed according to the delegation of the function.

According to an embodiment, the processor 212 may determine whether the first peer device 210 may use the result transfer method requested by the electronic device 100 according to the result transfer method 330 included in the resource inquiry message 300. For example, when the result transfer method 330 requested by the electronic device 100 includes screen mirroring, the processor 212 may determine whether the first peer device 210 may use the screen mirroring technology.

According to an embodiment, the processor 212 may determine whether the resources required by the electronic device 100 may be provided in the first peer device 210 in response to the resource inquiry message from the electronic device 100, and may generate a resource response message. For example, the resource response message received by the first peer device 210 may be an example shown in FIG. 4. According to an example, the resource response message 400 may include information 410 about whether the requested function may be executed, information 420 about the result may be transferred, and a busy state 430 of the device.

For example, the peer device sending the resource response message 400 checks the resource identifiers in the resource list 310 included in the resource inquiry message 300 and determines whether to include the resources corresponding to the checked resource identifiers. When the peer device includes the resources corresponding to the resource identifiers, the peer device may transmit a resource inquiry message including information indicating the function may be executed, and when the peer device does not include the resources corresponding to the resource identifiers, the peer device may transmit a resource inquiry message including information indicating the function may not be executed.

For example, the peer device sending the resource response message 400 checks the method designated in the result transfer method 330 included in the resource inquiry message 300, and when the result may be provided by the result transfer method, the peer device may indicate that the result may be transferred, and when the result cannot be transferred by the result transfer method designated in the resource inquiry message 300, the peer device may indicate that the result cannot be transferred.

For example, the busy state 430 of the device may include may include information on one or more of a CPU usage rate, a GPU usage rate, and a memory usage rate of the corresponding device. When the CPU usage rate, the GPU usage rate, and the memory usage rate are high, it may indicate the corresponding device is busy.

According to an embodiment, the processor 212 may receive the resource request message from the electronic device 100, and may perform an operation corresponding to the resource request message. For example, the resource request message may include a resource request message 600 as shown in FIG. 6. The resource request message 600 as shown in FIG. 6 may include information 610 about the function to be executed, information 620 about content to be executed, and setting information 630 of the electronic device.

According to an embodiment, in response to the content included in the resource request message 600, the processor 212 may activate an application, etc. for performing the corresponding function to be executed with reference to the information 610 about the function to be executed, and then, may access the content to be executed via the activated application with reference to the information 620 about the content to be executed. Also, according to the setting information 630 of the electronic device included in the resource request message 600, the processor 212 may use the setting information 630 of the electronic device when accessing or executing the content. For example, when the electronic device 100 needs a certain format for displaying content, the setting information 630 of the electronic device may include information about the certain format, and the processor 212 may transfer the information about the certain format with the request for the content from, for example, an application server. As such, the processor 212 may receive and execute content generated in a certain format when receiving content from the application server.

According to an embodiment, the processor 212 may generate a virtual display in the horizontal direction or the vertical direction corresponding to the display type of the electronic device 100, and may generate the virtual display to have a resolution corresponding to that of the electronic device 100. Therefore, according to an embodiments, shared data (content or execution screen) generated in the first peer device 210 and shared with the electronic device 100 may provide, for example, an effect of directly displaying the content on the display in corresponding direction of the electronic device 100 may be provided, and accordingly, image deterioration may be prevented.

According to an embodiment, the processor 212 may execute the function corresponding to the received resource request message, and may transfer the result of the execution of the function to the electronic device 100 by the transfer method desired by the electronic device 100. In an example, the processor 212 may execute content according to the definition in the resource request message, and may transfer the content execution result to the electronic device 100 by the result transfer method desired by the electronic device 100, e.g., through the screen mirroring.

According to an embodiment, when the electronic device 100 receives a user interface controlling operation for controlling the displayed content while the result of the function execution received through the mirroring is displayed on the display, the processor 212 may receive a control signal corresponding to the received user interface controlling operation from the electronic device 100. For example, the processor 212 may receive the control signal corresponding to the user interface controlling method from the electronic device 100 via the UIBC.

When receiving the control signal corresponding to the user interface controlling operation, the first peer device 210 may execute an operation corresponding to the received control signal. Also, because the mirroring is being performed, the result of performing the operation according to the control signal may be transferred to the electronic device 100 in real-time through the mirroring.

Figure 7:
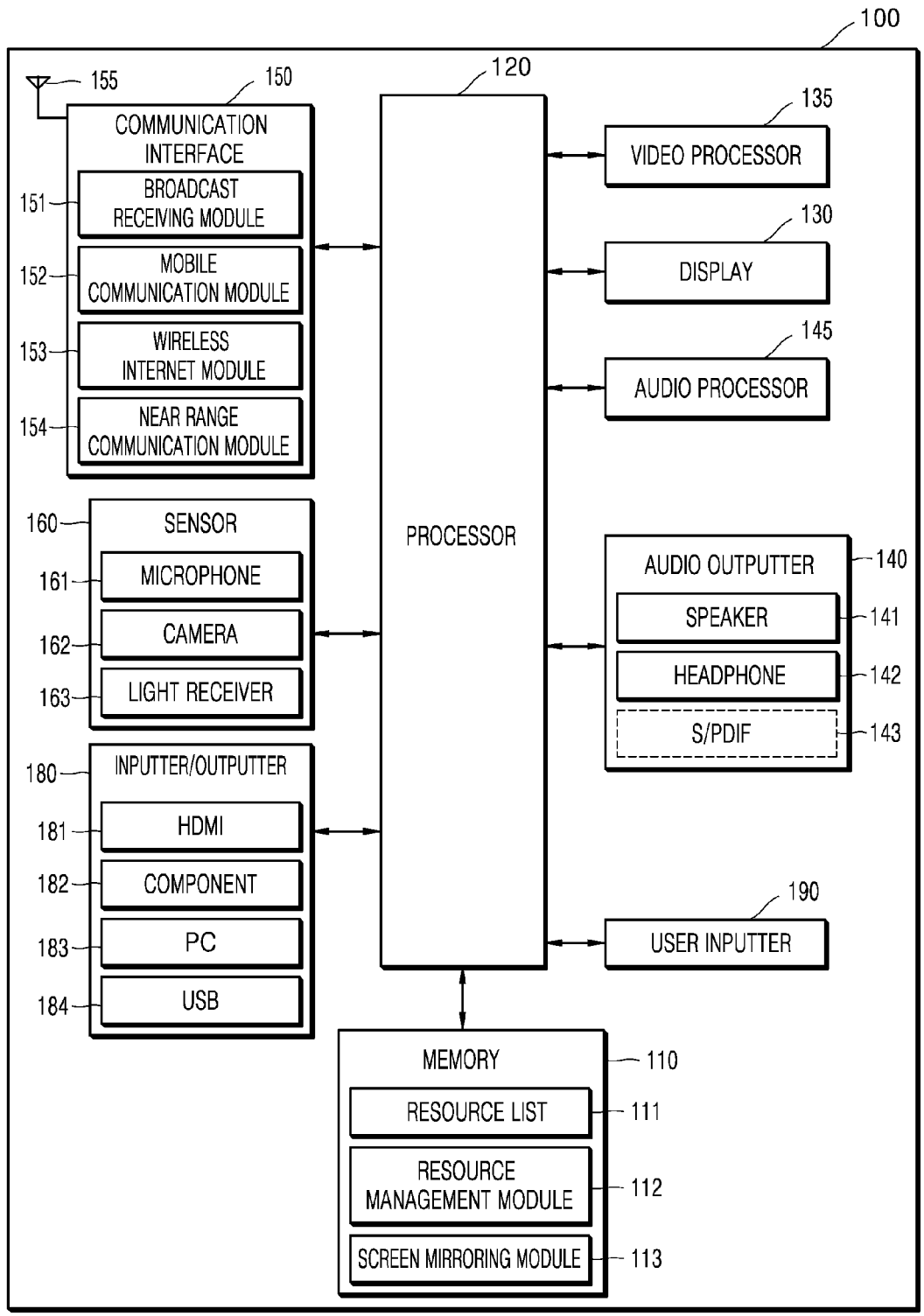
FIG. 7 is a block diagram of an electronic device according to an embodiment.

FIG. 7 is a block diagram of the electronic device 100 according to an embodiment.

In FIG. 7, the same elements as those of the electronic device 100 shown in FIG. 2 are denoted by the same reference numerals. Therefore, redundant descriptions about the electronic device 100 will be omitted.

Referring to FIG. 7, the electronic device 100 may further include the display 130, an antenna 155, e.g., a transmission/reception antenna, a sensor 160, an inputter/outputter 180, a video processor 135, an audio processor 145, an audio outputter 140, and a user inputter 190, in addition to the memory 110 and the processor 120.

With respect to the memory 110 and the processor 120, the same descriptions as those provided with reference to FIG. 2 are omitted.

The display 130 may display images on a screen according to the control of the processor 120. The image displayed on the screen may be received via one of the communication interface 150, the inputter/outputter 180, and the memory 110. A result screen of the function execution received from one or more peer devices of the peer device group 200 through the screen mirroring may be displayed on the display 130.

The antenna 155 may receive signals sent from other devices or transmit signals to the other devices. Although one antenna 155 is shown, a plurality of antennas may be provided.

The communication interface 150 may include one or more modules enabling wireless communication between the electronic device 100 and a wireless communication system or between the electronic device 100 and a network in which another electronic device is located. For example, the communication interface 150 may include a broadcast receiving module 151, a mobile communication module 152, a wireless internet module 153, and a near field communication module 154. The communication interface 150 may be referred to as a transmitter/receiver.

The broadcast receiving module 151 receives a broadcast signal and/or broadcast-related information from an external broadcast management server via a broadcast channel. The broadcast signal may include a TV broadcast signal, a radio broadcast signal, and a data broadcast signal, and moreover, may also include a broadcast signal in which a data broadcast signal is combined with the TV broadcast signal or the radio broadcast signal.

The mobile communication module 152 may transmit/receive a wireless signal to/from at least one of a base station, an external terminal, or a server on a mobile communication network. The wireless signal may include a voice call signal, a video call signal, or various types of data according to transmission/reception of texts/multimedia messages.

The wireless internet module 153 is a module for accessing wireless Internet, and may be built in or out of the device. As a wireless Internet technology, wireless LAN (WLAN), Wi-Fi, wireless broadband (Wibro), world interoperability for microwave access (Wimax), high speed downlink packet access (HSDPA), etc. may be used. The device may perform Wi-Fi peer to peer (P2P) connection with another device through the wireless internet module 153. A streaming service between devices may be provided through the Wi-Fi P2P connection, and data transmission/reception or a printing service by connecting to a printer may be provided.

The near field communication module 154 denotes a module for performing near field communication. The near field communication technology may include Bluetooth, radio frequency identification (RFID), infrared data association (IrDA), ultra wideband (UWB), ZigBee, etc.

The communication interface 150 according to an embodiment may connect the device to one or more peer devices of the peer device group 200 or may enable the transmission/reception of video/audio data through the wireless internet module 153 or the near field communication module 154.

The communication interface 150 according to an embodiment may receive content via the broadcast receiving module 151 or the wireless internet module 153.

The communication interface 150 according to an embodiment may transmit resource inquiry messages to one or more peer devices, receive the resource response messages, and transmit the resource request message to a peer device that is selected to execute the function, via the wireless internet module 153 or the near field communication module 154.

The communication interface 150 according to an embodiment may receive a result of executing the function from one or more peer devices of the peer device group 200 via the mirroring technique by using the wireless internet module 153 or the near field communication module 154.

The sensor 160 senses user voice, user image, or user interaction, and may include a microphone 161, a camera 162, and a light receiver 163.

The microphone 161 receives uttered voice of the user. The microphone 161 may convert the received voice into an electrical signal and outputs the electrical signal to the processor 120.

The camera 162 may receive an image (e.g., successive frames) corresponding to a motion of the user including gesture, within a camera recognition range.

The light receiver 163 receives an optical signal (including a control signal) from a remote control device. The light receiver 163 may receive an optical signal corresponding to a user input (e.g., touch, push, touch gesture, voice, or motion) from the remote control device. A control signal may be extracted from the optical signal according to the control of the processor 120.

The inputter/outputter 180 may transmit/receive video (e.g., moving pictures, etc.), audio (e.g., voice, music, etc.), and additional information (e.g., EPG, etc.) to/from the outside of the electronic device 100 according to the control of the processor 120. The inputter/outputter 180 may include one of a high-definition multimedia interface (HDMI) port 181, a component jack 182, a PC port 183, or a universal serial bus (USB) port 184. The inputter/outputter 180 may include a combination of the HDMI port 181, the component jack 182, the PC port 183, and the USB port 184.

The memory 110 according to an embodiment may store programs for processing and controlling the processor 120, and may store data input to or output from the electronic device 100. Also, the memory 110 may store data required in operations of the electronic device 100.

The programs stored in the memory 110 may be classified as a plurality of modules according to functions thereof.

The memory 110 according to an embodiment may include a resource list 111, a resource management module 112, a screen mirroring module 113, etc.

The resource list 111 includes information on one or more resources contained in the electronic device 100. For example, the resource list 111 may include information about performance of the processor (CPU, GPU, and NPU), information about a kind or a capacity of the memory, information about a size or specification of the display, information about performances of the video processor and the audio processor, information about a kind or specification of a communication module included in the communicator, etc.

The resource management module 112 may include one or more instructions. The one or more instructions determine whether the electronic device 100 has the resources for executing the requested function when the electronic device 100 receives a request for execution of the function, and when it is determined that there are insufficient resources for executing the function, inquire with peer devices whether the resources may be provided, and send a resource request to the peer device that may provide the resources.

The screen mirroring module 113 may include one or more instructions for performing a communication connection to the external peer device and receiving and outputting content to be displayed on the screen or execution screen data from the external peer device.

The processor 120 controls overall operations of the electronic device 100 and signal flow among internal elements of the electronic device 100, and processes the data. When there is a user input or a stored preset condition is satisfied, the processor 120 may execute an operation system (OS) and various applications stored in the memory 110.

Also, the processor 120 may include an internal memory. In this case, at least one of data, programs, or instructions stored in the memory 110 may be stored in the internal memory of the processor 120.

The processor 120 may include one or more processors. Here, one or more processors may include a CPU, a general-purpose processor such as an application processor (AP), a digital signal processor (DSP), a graphics dedicated processor such as a GPU and a vision processing unit (VPU), or an artificial intelligence dedicated processor such as an NPU.

The video processor 135 processes image data to be displayed on the display 130, and may perform various image processing operations such as decoding, rendering, scaling, noise filtering, frame rate conversion, and resolution conversion on the image data.

The audio processor 145 processes audio data. The audio processor 145 may perform various processes such as decoding, amplifying, noise filtering, etc. on the audio data.

The audio outputter 140 may output audio included in the broadcast signal received via the antenna 155, audio input through the communication interface 150 or the inputter/outputter 180, and audio stored in the memory 110 according to the control of the processor 120. The audio outputter 140 may include at least one of a speaker 141, a headphone output terminal 142, or Sony/Philips Digital Interface (S/PDIF) output terminal 143.

The user inputter 190 is a unit to which data for controlling the electronic device 100 is input by the user. For example, the user inputter 190 may include a keypad, a dome switch, a touch pad, a jog wheel, a jog switch, etc., but is not limited thereto.

Each of the components may be integrated, added, or omitted according to an embodiment. For example, two or more components may be combined as one or one component may be divided as two or more components. Also, functions for each block are to explain an embodiment of the disclosure and each specific operation or device are not limiting.

Figure 8:
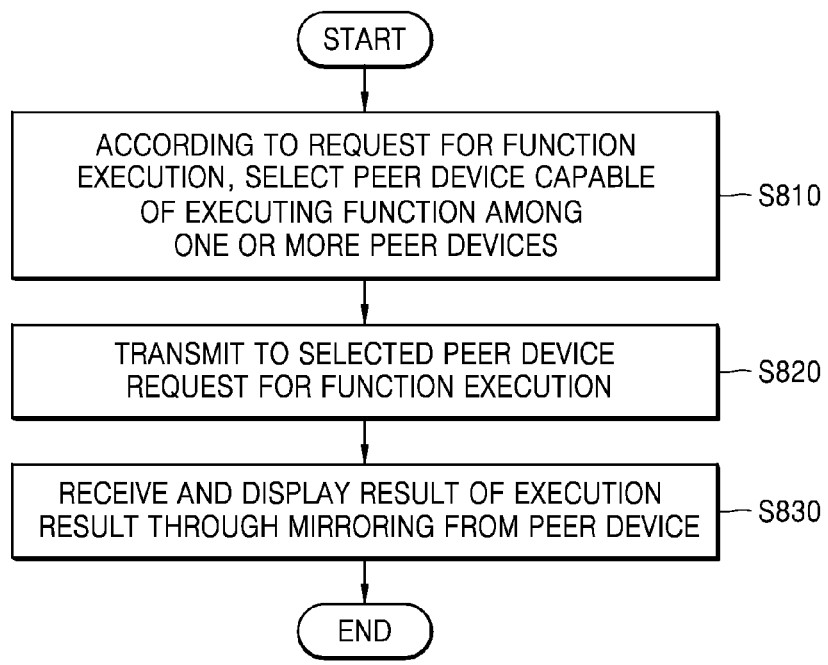
FIG. 8 is a flowchart illustrating operations of an electronic device according to an embodiment.

FIG. 8 is a flowchart illustrating operations of the electronic device 100 according to an embodiment.

Referring to FIG. 8, in operation S810, the electronic device 100 may select a peer device capable of executing requested function, among one or more peer devices according to a request for execution of the function.

For example, when receiving a request for execution of the function, the electronic device 100 determines whether the electronic device 100 includes resources required to execute the requested function. When it is determined that there are insufficient resources required to execute the requested function in the electronic device 100 as a result of determination, the electronic device 100 may search for the resources for executing the function from the outside of the electronic device 100. For example, the electronic device 100 may inquire with the peer devices around the electronic device 100 whether the peer devices have the resources for execution of the function, and may select one suitable peer device among the peer devices which transmit the responses to the inquiry to the electronic device 100. The peer device selected to be suitable for the execution of the function may include, for example, resources required to execute the corresponding function, may transfer the result of executing the function by the result transfer method desired by the electronic device 100, and may satisfy the result transmission speed.

In operation S820, the electronic device 100 may transmit a request for function execution to the peer device that is selected to execute the function.

The electronic device 100 may transmit the request for function execution to the peer device selected among one or more peer devices. The request for function execution may include information about the function to be executed, information about content to be executed, and setting information of the electronic device. For example, the setting information of the electronic device may include account information required to execute the content or the function, resolution information of the electronic device, information about an operating mode or display type of the display in the electronic device, UIBC information, etc.

In operation S830, the electronic device 100 may receive the result of executing the function from the peer device through screen mirroring, and may display result content of the function execution.

The peer device receiving the request for function execution from the electronic device 100 executes the corresponding function according to the request of the electronic device 100, and may transmit the result content of the function execution to the electronic device 100 through the screen mirroring. The electronic device 100 may display the result content of the function execution received through the screen mirroring on the display screen. When the result content of the function execution is received through the screen mirroring while the electronic device 100 is displaying content on a single-view screen, the electronic device 100 may switch the single-view screen into a multi-view screen and may display the result content of the function execution received from the peer device on one of the multi-view screen.

Figure 9:
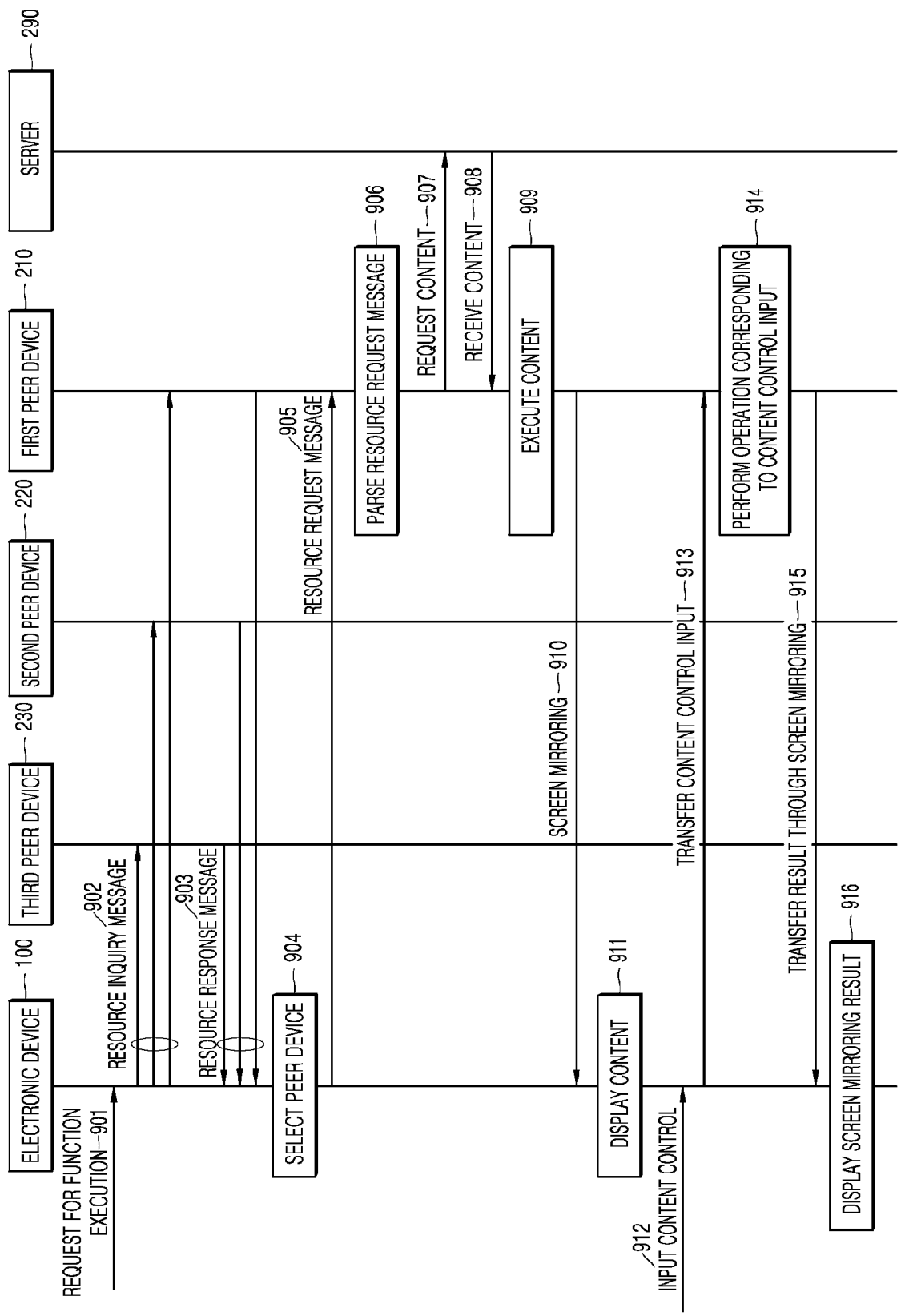
FIG. 9 is a flowchart illustrating detailed operations in an electronic device, according to an embodiment.

FIG. 9 is a flowchart illustrating detailed operations in the electronic device 100, according to an embodiment.

Referring to FIG. 9, in operation 901, the electronic device 100 may receive a request for function execution. For example, the request for function execution may be received according to a user input or a setting in the electronic device 100.

In operation 902, the electronic device 100 may transmit a resource inquiry message to one or more peer devices, e.g., the first peer device 210, the second peer device 220, and the third peer device 230.

The electronic device 100 may check resources required to execute the function requested in operation 901, and then may determine whether the electronic device 100 includes the required resources. As a result of determination, when the electronic device 100 includes the resources required to execute the function, the electronic device 100 may execute the function by using the resources. However, as a result of determination, when the electronic device 100 does not include the resources required to execute the function or includes insufficient resources, the electronic device 100 may perform an operation of inquiring whether the resources may be obtained from outside in order to complete the execution of the function. To do this, the electronic device 100 may transmit resource inquiry messages to the peer devices in order to inquire whether the peer devices include the resources required to execute the function.

The resource inquiry message is a message for inquiring whether the resources required to execute the function may be provided, and may include a resource list including resources required to execute the function, information about the function that is requested to be executed, and a result transfer method defining the method for the electronic device 100 to receive the result of the execution from the peer device. For example, the resource inquiry message may have a structure as shown in FIG. 3.

In operation 903, the peer devices receiving the resource inquiry message from the electronic device 100 determine whether the resources may be provided according to the resource inquiry message and generate and send resource response messages according to the determination to the electronic device 100.

For example, the peer devices may determine, in response to the resource inquiry message, whether the requested function may be executed by providing the resources of their own, whether the result may be transferred by the requested transfer method, and how busy they are, and then, may generate resource response messages including the determination results. For example, the resource response message may have a structure as shown in FIG. 4.

In operation 904, when receiving the resource response messages from the peer devices, the electronic device 100 may select one peer device to which the execution of the result is to be delegated, among the peer devices sending the resource response messages.

The electronic device 100 basically selects the peer device that may provide the resources required to execute the function among the peer devices that sent the resource response messages, but may select one peer device that is less busy among the peer devices that may provide the resources. Alternatively, among the peer devices that may provide the resources required to execute the function, a peer device having a faster network transmission speed may be selected. Considering the above factors, the electronic device 100 may select one of the peer devices that sent the resource response messages.

In operation 905, the electronic device 100 may transmit the resource request message to the selected first peer device 210.

The electronic device 100 may start a connection procedure to the selected first peer device 210. For example, the electronic device 100 and the first peer device 210 may perform a negotiation process for screen mirroring connection.

In the negotiation process, the electronic device 100 may transmit the resource request message 600 to the selected first peer device 210, wherein the resource request message 600 includes information about the function to be executed, information about content to be executed, and setting information of the electronic device as shown in FIG. 6. The information about the function to be executed may include, for example, an identifier of an application to be executed. The information about the content to be executed may include an identifier of the content that is actually to be executed on the application. The setting information of the electronic device may include the information about resolution of the electronic device 100, information about the display type (operating mode) of the electronic device 100, UIBC information, etc. The information about the display type of the electronic device 100 may include information about whether the display of the electronic device 100 is a horizontal type display or a vertical type display, or the display of the electronic device 100 operates in a horizontal mode or in a vertical mode. The UIBC information is used when the electronic device 100 transmits a control message according to the user input to the peer device.

In operation 906, the first peer device 210 receiving the resource request message may identify the content in the resource request message by parsing the resource request message.

For example, the first peer device 210 may identify that which application needs to be executed, which content needs to be executed on the application, how the content may be executed according to setting information of the electronic device, etc. by parsing the resource request message.

For example, the first peer device 210 may check the resolution information supported by the electronic device 100, and then determines the resolution commonly supported by the devices. Also, the first peer device 210 may determine whether the image rotates in correspondence with the display type of the electronic device 100. According to an embodiment, the first peer device 210 may convert the image corresponding to the determined resolution and the display type, and may transfer the converted image to the electronic device 100.

In operation 907, the first peer device 210 may request content from a server 290, e.g., a content providing server, according to the content included in the resource request message. When requesting for the content, the first peer device 210 may transmit the content request by using at least some of the setting information of the electronic device so as to receive the content according to the setting information of the electronic device. For example, the setting information of the electronic device may be the setting information 630 of the electronic device described above with reference to FIG. 6. For example, when the setting information of the electronic device includes information indicating the PC version, the first peer device 210 may request content in the PC version from the server 290 providing content.

In operation 908, the first peer device 210 may receive the content from the server 290 providing content in response to the content request.

In operation 909, the first peer device 210 may execute the content transmitted from the server 290 providing content. The execution of content may include, for example, when the content is a 4K image, an operation of decoding the 4K image by using a decoder capable of decoding the 4K image in the first peer device 210.

Also, the first peer device 210 may identify the resolution information supported by the electronic device 100 with reference to the setting information of the electronic device 100, and may determine the resolution that may be commonly supported by the devices. Also, the first peer device 210 may determine whether the image rotates in correspondence with the display type of the electronic device 100. According to an embodiment, the first peer device 210 may convert the image corresponding to the determined resolution and the display type.

For example, the first peer device 210 may generate data (e.g., screen data) to be transferred to the electronic device 100, in correspondence with the determined resolution (e.g., 1920×1080). For example, the first peer device 210 may generate the shared data by changing the screen data corresponding to the resolution (2560×1440) thereof into the screen data corresponding to the resolution (1920×1080) of the electronic device 100.

For example, the first peer device 210 may generate the shared data for the vertical type display, based on the fact that the display type of the electronic device 100 is the vertical type display. For example, when generating the shared data, the first peer device 210 may change the data into the vertical type by rotating a virtual display for drawing (or generating) the shared data.

According to an embodiment, the first peer device 210 may generate a virtual display having a resolution of 1920×1080 in correspondence with the resolution (1920×1080) of the electronic device 100. According to an embodiment, the first peer device 210 may generate the screen data of the vertical type with a transverse-longitudinal ratio (9:16) in the virtual direction of the vertical type. For example, a first peer device 210 may generate the screen data in the vertical type displayed on the electronic device 100 (e.g., portrait layout) by using the virtual display of the vertical type. According to an embodiment, the first peer device 210 may generate the shared data without rotating the screen data. The first peer device 210 may generate the shared data by using the virtual display corresponding to the resolution supported by the electronic device 100.

In operation 910, the first peer device 210 displays the executed content on the display thereof, and may transfer the display screen to the electronic device 100 through the screen mirroring such that the content displayed on the display may be also displayed on the electronic device 100. According to an embodiment, the first peer device 210 may transfer the data regularly, continuously, or in real-time. The first peer device 210 may transfer the data through streaming.

In operation 911, the electronic device 100 may display the content execution result, e.g., content screen, received from the first peer device 210 through the screen mirroring on the display.

When the electronic device 100 already has displayed another content on the screen at the time of displaying the content received through the screen mirroring, the electronic device 100 switches the screen into the multi-view screen in order to display the content received through the screen mirroring in addition to the content that has been displayed, and may display the content received through the screen mirroring in one window in the multi-view screen.

According to an embodiment, the electronic device 100 may directly display image frame data received from the first peer device 210. For example, when the image frame data that is set to correspond to the vertical type display is transferred from the first peer device 210, the electronic device 100 may directly display the image frame data without performing any process on the received image (e.g., rotation and/or scaling). For example, the data of the same shape as that drawn through the virtual display of the first peer device 210 may be displayed in the vertical type display window of the electronic device 100.

In operation 912, a content control input with respect to displayed content may be received while the content received through the screen mirroring is being displayed. For example, the content control input may include various inputs for controlling content, e.g., an input for controlling reproduction of the content, an input for requesting to play another content, etc.

In operation 913, the electronic device 100 may transfer the content control input to the first peer device 210. The electronic device 100 may transfer the content control input to the first peer device 210 via the UIBC.

In operation 914, the first peer device 210 may perform an operation corresponding to the content control input. The operation corresponding to the content control input may be performed in the first peer device 210 itself, or a result of performing the operation may be received from the content providing server 290.

In operation 915, the first peer device 210 may transfer the result of performing the operation corresponding to the content control input to the electronic device 100 through the screen mirroring.

In operation 916, the electronic device 100 may display the result of performing the operation received through the screen mirroring on the display.

Figure 10:
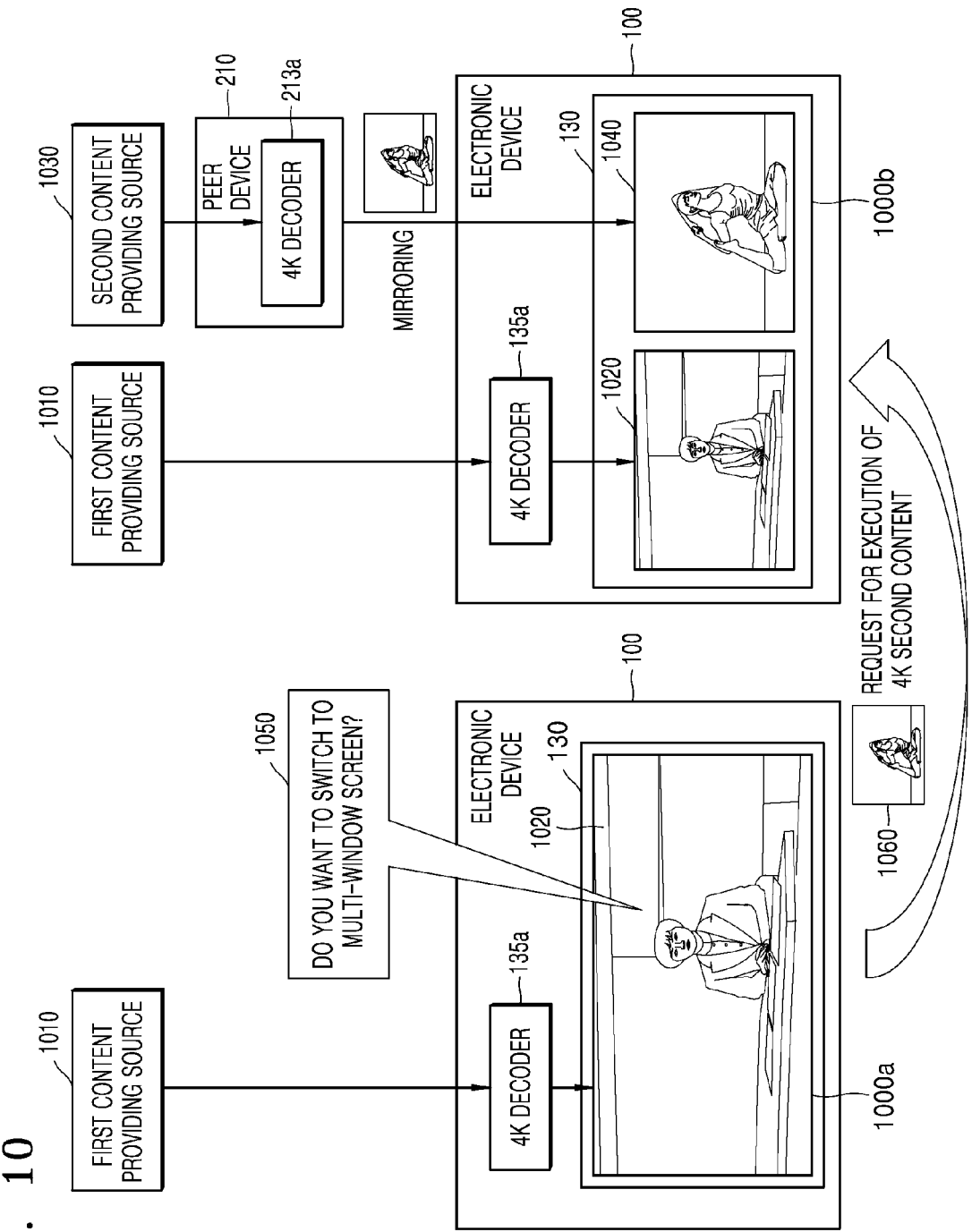
FIG. 10 is a reference diagram illustrating operations for providing a single-view screen and then providing a multi-view screen by using resources of a peer device, in an electronic device, according to an embodiment.

FIG. 10 is a reference diagram illustrating operations for providing a single-view screen and then providing multi-view screen by using resource of a peer device, in the electronic device 100 according to an embodiment.

Referring to FIG. 10, the electronic device 100 receives first content from a first content providing source 1010 and decodes the first content by using a 4K decoder 135a, and then displays the decoded first content 1020 on a display 130 as a single-window screen 1000a.

While displaying the first content 1020 in the single-window screen, the electronic device 100 may receive a request for execution of second content in a multi-window screen. For example, a certain button may be provided in a remote control device controlling the electronic device 100 for requesting the multi-window screen, or a graphic user interface 1050 may be provided on the electronic device 100 for requesting the multi-window screen.

When receiving a second content execution request 1060 in the multi-window screen, the electronic device 100 determines whether there are resources required to provide the execution of the second content in addition to the first content that has been already executed. According to the determination, when it is determined that there are insufficient resources for executing the second content, the electronic device 100 may transmit resource inquiry messages to one or more peer devices to inquire whether the resources may be provided. The electronic device 100 may select one peer device that may provide the resources among the peer devices that sent resource response messages in response to the resource inquiry message, and then may transfer the resource request message to the selected first peer device 210. The resource request message may include information for executing the second content, etc.

The first peer device 210 receiving the resource request message accesses a second content providing source 1030 to receive the second content with reference to the information included in the resource request message, decodes the second content by using a 4K decoder 213a, displays the decoded second content on the display of the first peer device 210, and transfers a content execution screen to the electronic device 100 through screen mirroring.

Then, the electronic device 100 changes the screen of the display 130 into the multi-window screen, and displays the first content 1020 decoded by the decoder 135a of the electronic device 100 in a first window of the multi-window screen 1000b and displays the second content 1040 decoded by the decoder 213a of the first peer device 210 in a second window.

According to an embodiment, the electronic device 100 may provide the multi-window screen by using the resources of peer devices when there is only one decoder in the electronic device 100.

Figure 11:
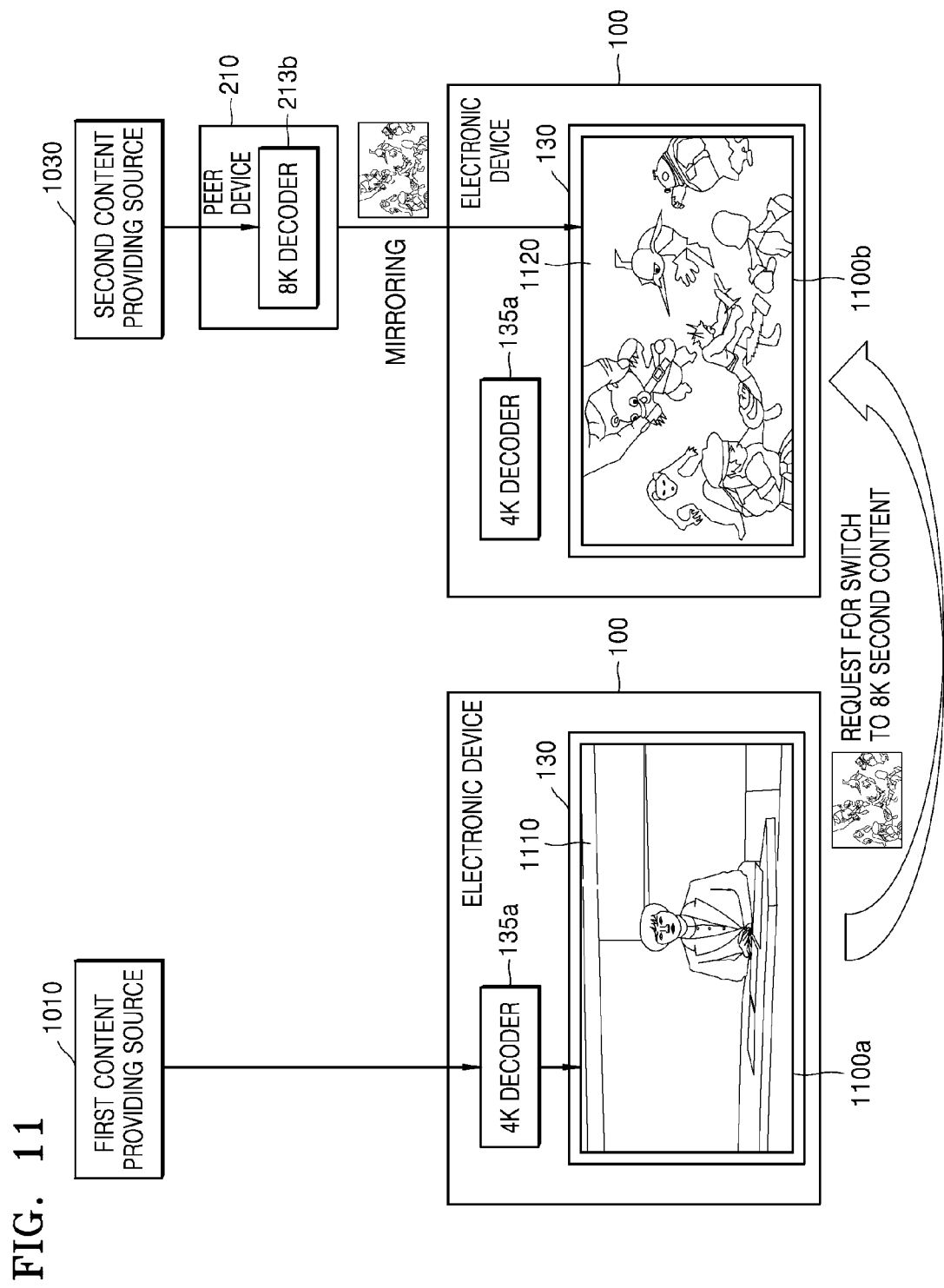
FIG. 11 is a reference diagram illustrating operations for providing a 4K image on a single-view screen and then providing an 8K image by using resources of a peer device, in an electronic device according to an embodiment.

FIG. 11 is a reference diagram illustrating operations for providing a 4K image on a single-view screen and then providing an 8K image by using resource of a peer device, in the electronic device 100 according to an embodiment.

Referring to FIG. 11, the electronic device 100 receives first content from the first content providing source 1010 and decodes the first content by using the 4K decoder 135a, and then displays the decoded first content 1110 on the display 130 as a single-window screen 1100a.

While displaying the first content 1110 on the display, the electronic device 100 may receive a request for execution of an 8K second content.

When receiving the 8K second content execution request, the electronic device 100 determines whether the electronic device 100 includes resources for providing execution of the 8K image, and when it is determined that there are insufficient resources for executing the second content, the electronic device 100 may transmit resource inquiry messages to one or more peer devices to check whether the resources may be provided by the peer devices. The electronic device 100 may select one peer device that may provide the resources among the peer devices that sent resource response messages in response to the resource inquiry message, and then may transfer the resource request message to the selected first peer device 210. The resource request message may include information for executing the second content, etc.

The first peer device 210 receiving the resource request message accesses a second content providing source 1030 to receive the 8K second content with reference to the information included in the resource request message, decodes the second content by using an 8K decoder 213b, displays the decoded second content on the display of the first peer device 210, and transfers a content execution screen to the electronic device 100 through screen mirroring.

Then, the electronic device 100 may switch the content displayed on the screen of the display 130 from the first content 1110 decoded by the 4K decoder 135a of the electronic device 100 to the second content 1120 decoded by the 8K decoder 213b of the first peer device 210 and display the second content 1120 as a single-window 1100b.

According to an embodiment, even when the electronic device 100 includes only one decoder for decoding the 4K image, the electronic device 100 may provide images of higher resolution by using the resources of peer devices.

Figure 12:
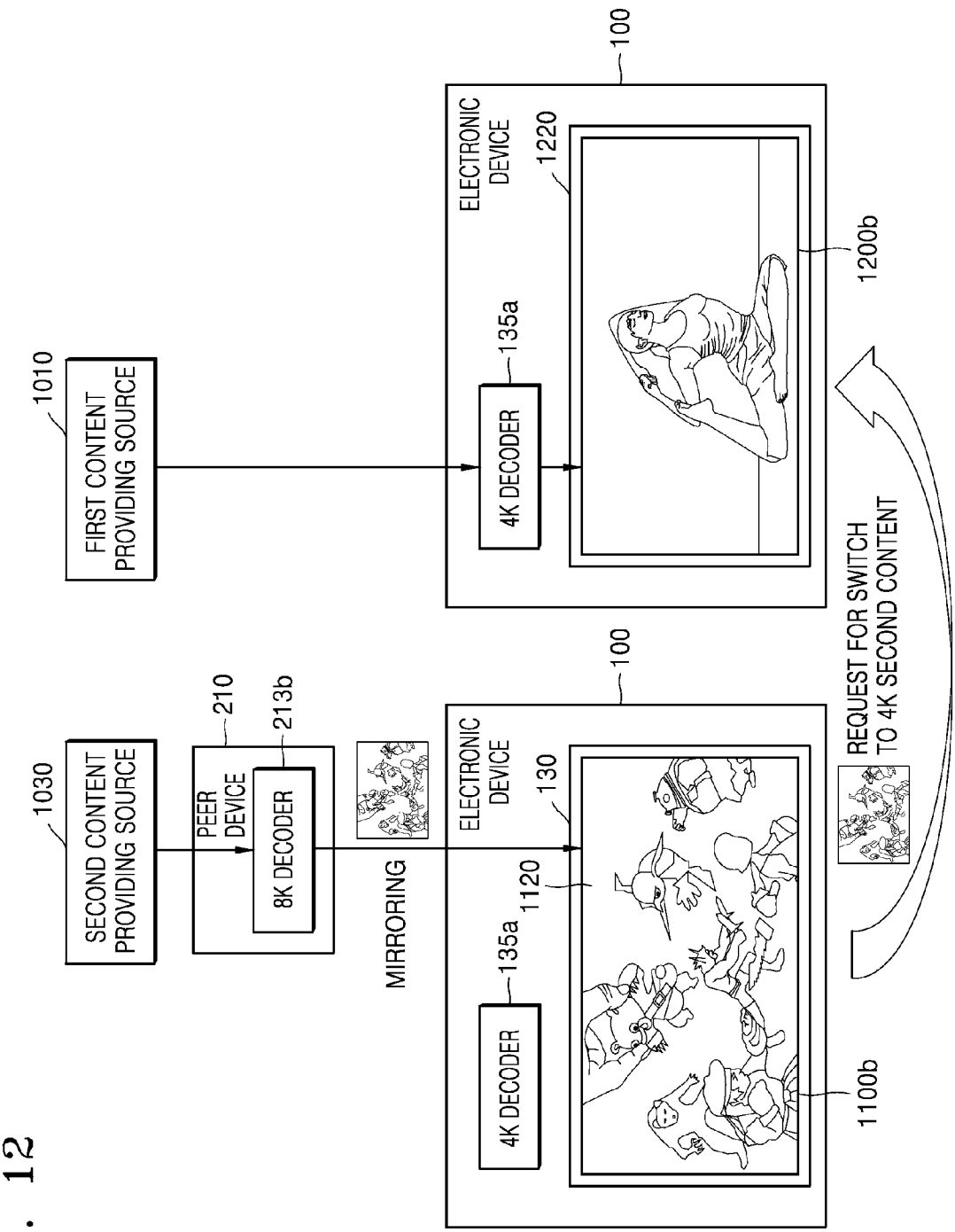
FIG. 12 is a reference diagram illustrating operations of switching from an 8K image to a 4K image in an electronic device, according to an embodiment.

FIG. 12 is a reference diagram illustrating operations of switching from an 8K image to a 4K image in the electronic device 100 according to an embodiment.

Referring to FIG. 12, the electronic device 100 receives and displays decoded second content 1120 from the first peer device 210 through the screen mirroring, wherein the second content from the second content providing source 1030 is decoded by using an 8K decoder 213b.

While displaying the second content 1120 on the display, the electronic device 100 may receive a request for execution of a 4K first content.

When receiving a request for execution of the 4K first content, the electronic device 100 determines whether the electronic device 100 include resources for providing the execution of the 4K image. According to the determination, when it is determined that the resources for executing the first content are included in the electronic device 100, the electronic device 100 may terminate the reception through the screen mirroring from the first peer device 210.

In addition, the electronic device 100 requests the first content from the first content providing source 1010 and then decodes the first content by using the 4K decoder, and displays the first content 1220 on the display as a single-window 1200*b*.

According to an embodiment, when receiving a request for switch to the 4K image while receiving the 8K image from the peer device through the screen mirroring, the electronic device 100 determines whether the electronic device 100 may execute the 4K image. When the 4K image may be executed by the electronic device 100, the electronic device 100 finishes the screen mirroring and provides the 4K image by using the resources of its own.

Figure 13:
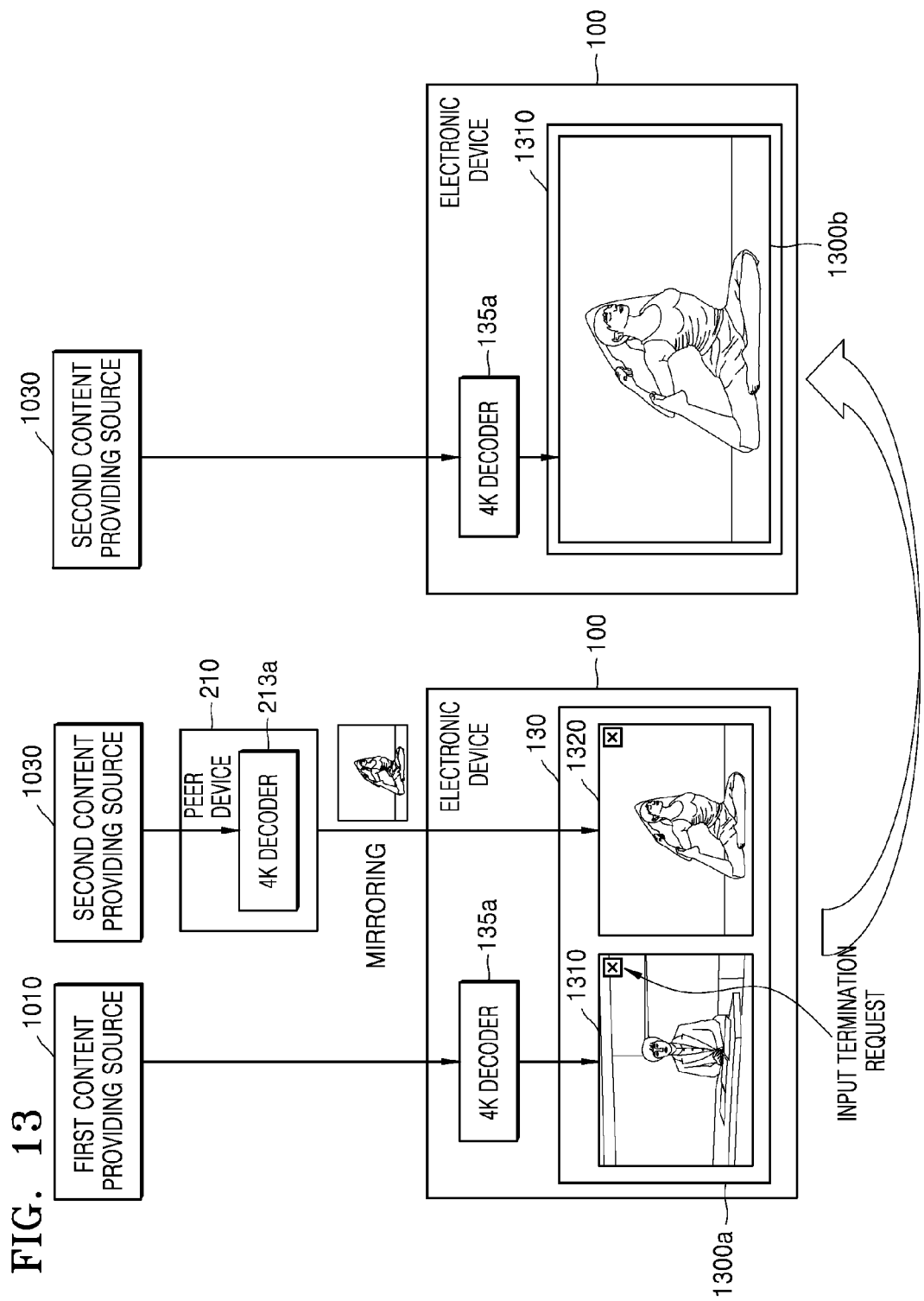
FIG. 13 is a reference diagram illustrating operations in which two images are provided on a multi-window screen and then one window is turned off, in an electronic device, according to an embodiment.

FIG. 13 is a reference diagram illustrating operations in a case in which two images are provided on a multi-window screen and then one window is turned off, in the electronic device 100 according to an embodiment.

Referring to FIG. 13, the electronic device 100 receives the first content from the first content providing source 1010, decodes the first content by using the 4K decoder 135*a*, and displays first content 1310 in a first window of the multi-window screen. In addition, the electronic device 100 receives the second content that is decoded by the 4K decoder 213*a* of the first peer device 210 through the screen mirroring, and displays second content 1320 in a second window of the multi-window screen 1300*a*.

As described above, while displaying the first content 1310 and the second content 1320 on the multi-window screen, the electronic device 100 may receive a request for termination of the first window displaying the first content. The termination request may be received, for example, by selecting a termination item 1330 arranged at an edge of the first window.

As described above, when receiving the request for termination of the first window, the electronic device 100 may terminate the receiving of the first content from the first content providing source 1010 and the decoding of the first content, and may provide the second content 1320 that was displayed in the second window in the single-view screen. However, in this case, that is, in a case of providing content in the single-view screen, the electronic device 100 continuously receiving the content displayed on the single-view screen from the first peer device 210 through the screen mirroring, thereby having the decoder 135*a* of the electronic device 100 in an idle state. That is, in a case in which the multi-view screen of the electronic device 100 is switched into the single-view screen, when the second content that is received through the screen mirroring may be decoded by the decoder 135*a* of the electronic device 100, it may show better performance to receive and decode the second content directly by the electronic device 100 than to receive the second content through the screen mirroring. Therefore, when switching the multi-view screen to the single-view screen, the electronic device 100 may determine whether the content displayed on the single-view screen may be executed by using the resources of the electronic device 100. When it is determined that the resources of the electronic device 100 may be used, the electronic device 100 finishes receiving from the first peer device 210 through the screen mirroring, directly accesses the second content providing source 1030 to receive the second content displayed on the single-view screen, decodes the second content by using the decoder 135*a*, and then, displays the second content on the single-view screen 1300*b* of the display. According to an embodiment, the electronic device 100 displays the content decoded by the internal decoder thereof in a first window and displays the received content that is decoded by the decoder in the peer device that is outside the electronic device 100 in a second window for providing the multi-view screen, and then, when the first window is terminated, the multi-view screen may be switched to the single-view screen. Here, when the first window is terminated and the second window displays the content received from the peer device through the screen mirroring, it might not be efficient that the operation of receiving the content from outside through the screen mirroring has to be performed even when the decoder in the electronic device 100 may be used. Therefore, the electronic device 100 performs an evaluation, and when it is determined that it is more efficient that the content output through the single-view screen is decoded by the decoder in the electronic device 100, the electronic device 100 may disconnect the screen mirroring connection and may access and receive the content such that the content may be decoded by the decoder thereof and displayed.

Figure 14:
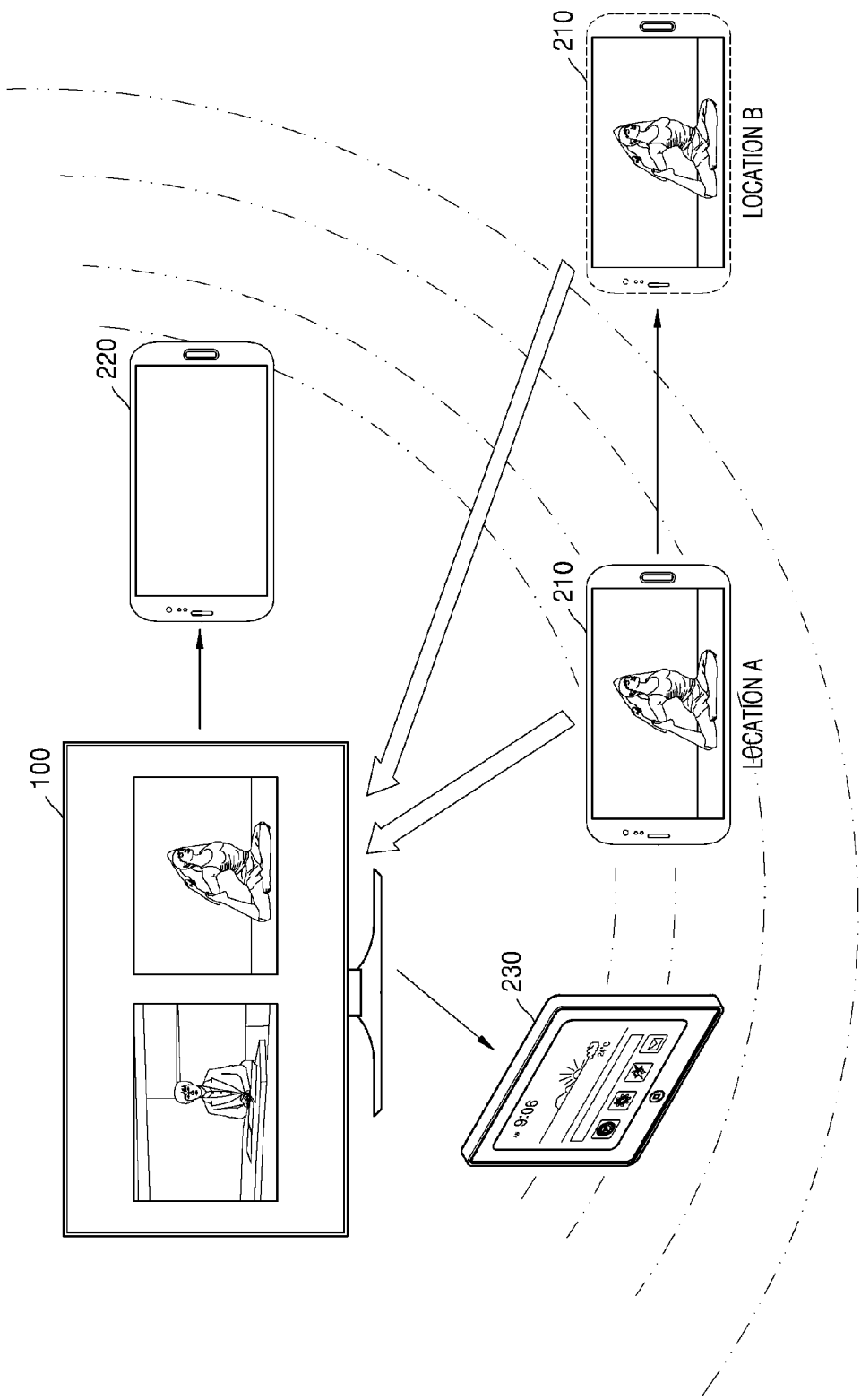
FIG. 14 is a reference diagram illustrating operations of receiving a content execution result from an initially selected peer device through screen mirroring and then re-evaluating peer devices when a certain event occurs to re-select a peer device for executing the function, according to an embodiment.

FIG. 14 is a reference diagram illustrating operations of receiving a content execution result from an initially selected peer device through screen mirroring and then re-evaluating peer devices one a certain event occurs to re-select a peer device for executing the function, according to an embodiment.

Referring to FIG. 14, the electronic device 100 provides the multi-view screen including the first window displaying the first content decoded by the internal decoder of the electronic device 100 and the second window displaying the second content decoded by the decoder of the first peer device 210.

As described above, while the electronic device 100 provides the multi-view screen by using the resources of external peer device, the electronic device 100 may evaluate the screen mirroring performance from the first peer device 210. For example, the screen mirroring performance may include a transmission speed of the content from the first peer device 210, etc. The electronic device 100 monitors the transmission speed of the content received from the first peer device 210 through the screen mirroring, when the transmission speed of the content is equal to or less than a certain threshold value, the electronic device 100 may predict that there may be an issue in display quality of the content received from the first peer device 210. For example, when the first peer device 210 moves from a location A to a location B, the transmission speed of the content received from the first peer device 210 may be less than the certain threshold value. Therefore, in this case, the electronic device 100 may re-select the peer device that is to execute the content and to transmit the content execution result through the screen mirroring. The electronic device 100 may re-evaluate the peer devices and re-select the peer device to execute the function by the same method as that used to initially select the first peer device 210. For example, the electronic device 100 transmits resource inquiry messages to peer devices, e.g., the first, second, and third peer devices 210, 220, and 230, and among the first, second, and third peer devices 210, 220, and 230 which sent the resource response messages, the electronic device 100 may re-select a peer device that may provide resources and indicate that the peer device is not busy. Here, the electronic device 100 may further consider the network speed of each peer device.

When the peer device 220 is re-selected as the device for executing the function by the electronic device 100, the electronic device 100 may transmit a resource request message to the re-selected second peer device 220. In addition, when the peer device is re-selected, because the initially selected first peer device 210 has executed a part of the second content, the initially selected first peer device 210 provides the re-selected second peer device 220 with information about processed degree of executing the content. Thus, the re-selected second peer device 220 may execute the content seamlessly and provide the electronic device 100 with the content through the screen mirroring. For example, when the second content is a certain music video executed on YouTube application and the initially selected first peer device 210 runs the music video up to 5 minutes, the electronic device 100 provides the re-selected second peer device 220 with the resource request message including information indicating 'YouTube application, name of music video, processed degree 5 minutes'. Thus, the re-selected second peer device 220 executes YouTube application to play the corresponding music video from a point after 5 minutes and transmits the content to the electronic device 100 through the screen mirroring so as to implement content reproduction seamlessly.

In an example of FIG. 14, the re-selection of the peer device by the electronic device 100 is triggered by an event that the performance of the screen mirroring degrades, e.g., reduction in the transmission speed of the content, but the event is not limited to the above example.

According to an embodiment, the electronic device 100 may determine whether the peer device is re-selected when one window in the multi-view screen is terminated.

According to an embodiment, the electronic device 100 may determine whether the peer device is re-selected by regularly monitoring the screen mirroring performance. For example, the electronic device 100 may determine whether the peer device is re-selected by monitoring the screen mirroring performance every 5 minutes.

Figure 15:
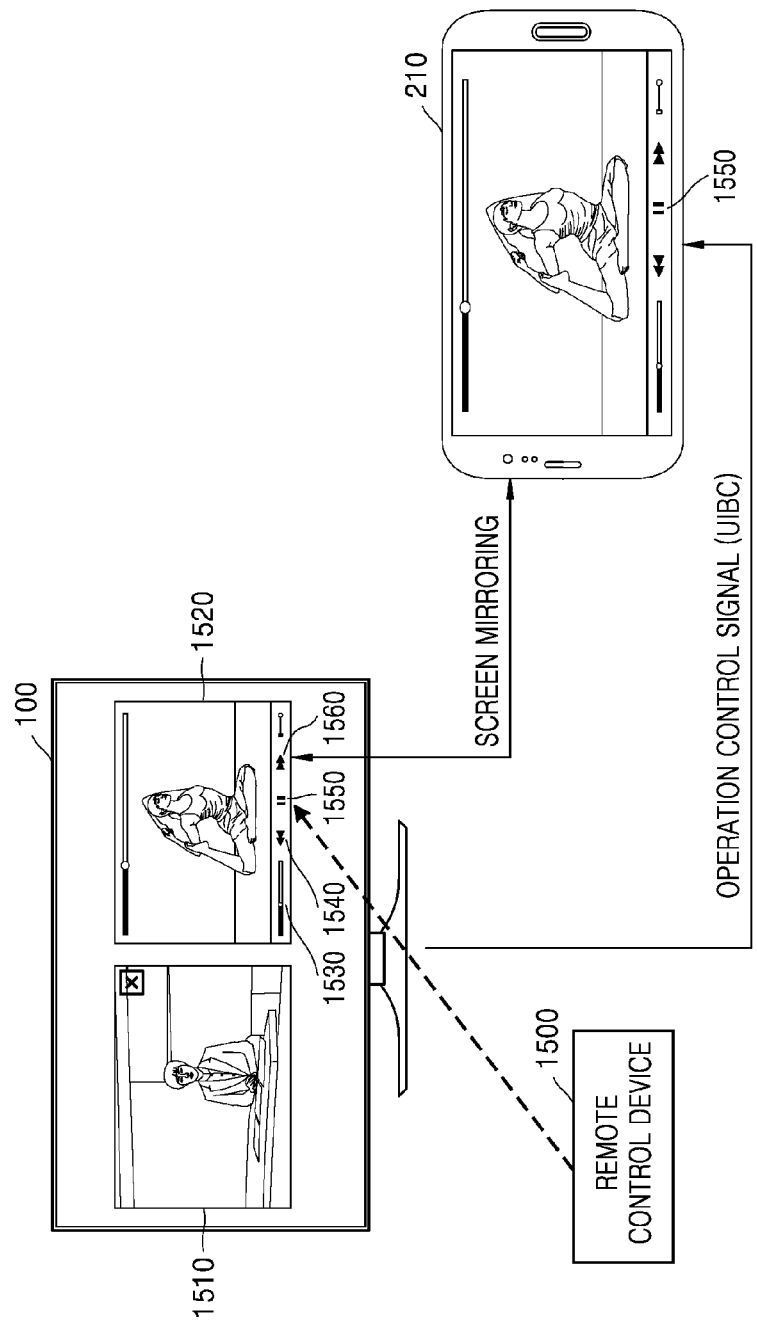
FIG. 15 is a reference diagram illustrating operations of controlling displayed content through screen mirroring in an electronic device, according to an embodiment.

FIG. 15 is a reference diagram illustrating operations of controlling displayed content through screen mirroring in the electronic device 100 according to an embodiment.

Referring to FIG. 15, the electronic device 100 provides the multi-view screen including the first window displaying first content 1510 decoded by the internal decoder of the electronic device 100 and the second window displaying second content 1520 decoded by the decoder of the first peer device 210. A scale 1530 displays a progress of playing the second content 1520, a button 1540 allows for a fast backward, a button 1560 allows for a fast forward, and a play stop/start button 1550 allows to execute the stop and start function of playing the content.

The second content displayed on the second window of the electronic device 100 is executed by the first peer device 210, and the electronic device 100 just receives and outputs the data displayed on the display of the first peer device 210 on the display thereof. Therefore, the electronic device 100 has no authority to control the second content displayed in the second window. However, the user watches the second content through the electronic device 100, and thus, the user may want to control the second content through the electronic device 100. A mechanism allowing the user to control the second content through the electronic device 100 may be provided.

To this end, when receiving a user input for controlling the second content 1520 displayed on the electronic device 100, the electronic device 100 may transfer the user input received by the electronic device 100 to the first peer device 210 via the UIBC. Then, the first peer device 210 may perform a content controlling operation corresponding to the user input received through the UIBC. The first peer device 210 is in a state of transferring the content to the electronic device 100 through the screen mirroring, a result corresponding to the content controlling operation performed in the first peer device 210 may be transferred to the electronic device 100 in real-time via the mirroring.

For example, when the user watches the electronic device 100 and selects a play stop/start button 1550 of the second content by using a remote control device 1500, the electronic device 100 may transfer coordinate information corresponding to the play stop/start button 1550 selected by the user to the first peer device 210 via the UIBC. The first peer device 210 may identify a menu button corresponding to the received coordinate information by converting the coordinate information into coordinate information of the content displayed on the first peer device 210. When the selected menu button is identified, the first peer device 210 may perform a control operation corresponding to the identified button, e.g., to stop playing the content or to start playing the content.

For example, when sensing a user input on the screen on which the content is displayed through the screen mirroring, the electronic device 100 may transfer the user input (e.g., control message) to the first peer device 210 via the UIBC. According to an embodiment, the electronic device 100 may transfer a touched coordinate value for controlling the first peer device 210 in correspondence with the user input of the electronic device 100, without performing an additional input process (e.g., coordinate conversion, etc.) on the user input. When receiving a coordinate value corresponding to the user input from the electronic device 100, the first peer device 210 may process an operation corresponding to a menu or an item corresponding to the coordinate value.

Figure 16:
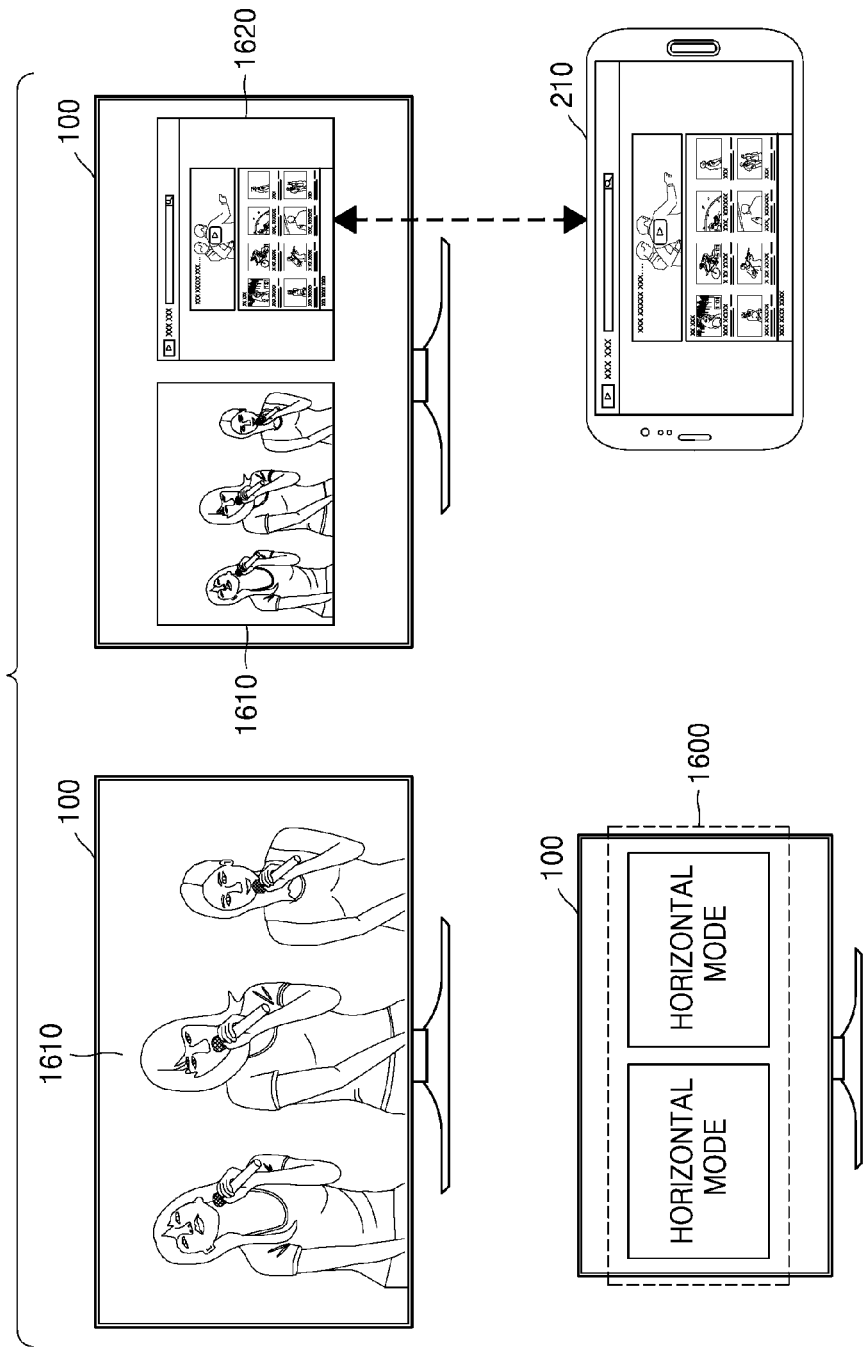
FIG. 16 is a reference diagram illustrating operations of receiving content in a format suitable for a multi-view screen format of an electronic device, when receiving content from a peer device through screen mirroring, according to an embodiment.

FIG. 16 is a reference diagram illustrating operations of receiving content in a format suitable for a multi-view screen format of the electronic device 100, when receiving content from a peer device through screen mirroring, according to an embodiment.

When the electronic device 100 provides a multi-view screen, the multi-view screen may include two or more windows, each of which may be provided in a horizontal mode or a vertical mode.

When the electronic device 100 switches the single-view screen into the multi-view screen and the content displayed in one window in the multi-view screen is received from the external peer device through the screen mirroring, the content received from the peer device needs to have a type suitable for the format of the window on which the content is to be displayed. For example, when the window on which the content received through the screen mirroring is to be displayed is in the horizontal mode, the content transmitted from the peer device through the screen mirroring may have a horizontal format. For example, when the window on which the content received through the screen mirroring is to be displayed is in the vertical mode, the content transmitted from the peer device through the screen mirroring may have a vertical format.

As described above, in order for the electronic device 100 to receive the content in a desired format, the resource request message including the setting information of the electronic device 100 needs to be transmitted. For example, the resource request message 600 as shown in FIG. 6 may include the setting information 630 of the electronic device 100, and the setting information 630 of the electronic device 100 may include information about a display format of the content. For example, the setting information 630 of the electronic device 100 may include information indicating whether the content is in the horizontal format or the vertical format. The first peer device 210 receiving the resource request message 600 may access the content, taking into account the information about the format included in the setting information 630 of the electronic device 100. According to an embodiment, when the first peer device 210 requests the content from the content providing server, the first peer device 210 may transmit the format information of the content so as to receive the content generated according to the format information from the content providing server. For example, an application screen may vary depending on the screen type, that is, when the screen is provided in a horizontal type screen, e.g., a PC screen, and when the screen is provided in a vertical type screen, e.g., a mobile device screen. The application screen of the PC type version may include more items in a wider screen size. The application screen of the mobile type version may include less items in a narrower screen size. When the peer device is a mobile device, the peer device basically accesses the application content of the mobile version. However, according to an embodiment, when the peer device accesses the content according to a request from the electronic device of a PC type, for example, a television, the content may be provided to the electronic device of the PC type, as well as the peer device, and thus, the peer device may provide the screen suitable for the format of the electronic device. Therefore, when the electronic device is a PC type device such as a television and the peer device is a mobile type device such as a smartphone, the peer device may provide an application screen of a PC version to the electronic device.

Referring to FIG. 16, according to a format 1600 of the multi-view screen in the electronic device 100, a first window and a second window are both in the horizontal mode when there are two windows.

When the electronic device 100 additionally receives a request for execution of second content and provides the second content in a multi-view screen while displaying first content 1610 in a single-view screen, the second window on which the second content received through the screen mirroring is to be displayed is in the horizontal format, and thus, the electronic device 100 may transmit, to the peer device executing the second content, the resource request message including a request the peer device to send the second content in the horizontal format. The horizontal format may include, for example, information indicating that the application screen is a PC version. The first peer device 210 receiving the resource request message may request the second content of the horizontal format, that is, the PC version, from the server when accessing the second content, and then, receives and executes the second content. In addition, when the first peer device 210 transmits the executed second content in the PC version to the electronic device 100 through the screen mirroring, the electronic device 100 may display the second content 1620 of the PC version with the first content 1610.

Figure 17:
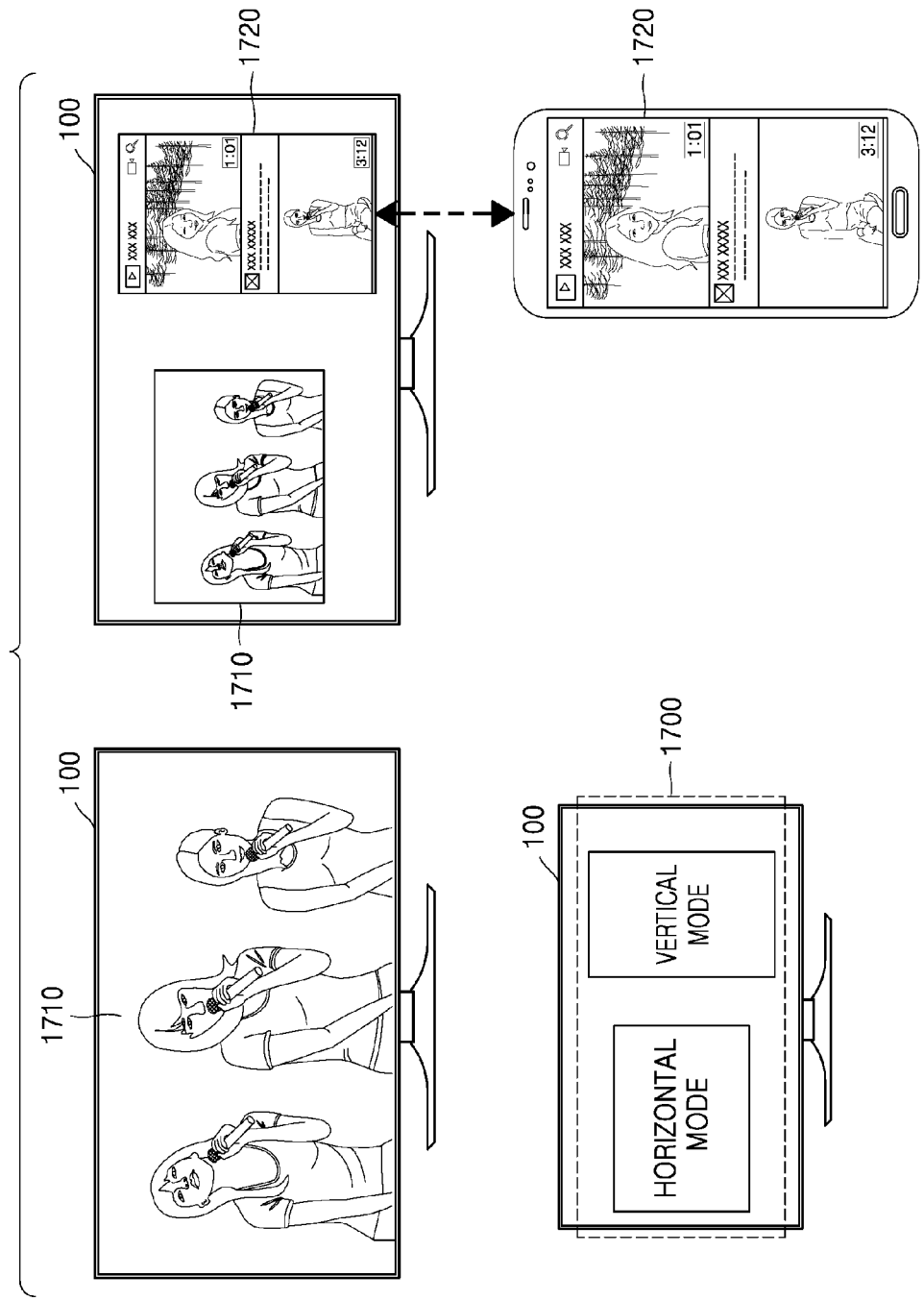
FIG. 17 is a reference diagram illustrating operations of receiving content in a format suitable for a multi-view screen format of an electronic device, when receiving content from a peer device through screen mirroring, according to an embodiment.

FIG. 17 is a reference diagram illustrating operations of receiving content in a format suitable for a multi-view screen format of the electronic device 100, when receiving content from a peer device through screen mirroring, according to an embodiment.

Referring to FIG. 16, according to a format 1700 of the multi-view screen in the electronic device 100, a first window in the horizontal mode and a second window in the vertical mode may be provided when there are two windows.

When the electronic device 100 additionally receives a request for execution of second content and provides the second content in a multi-view screen while displaying first content 1710 in a single-view screen, the second window in which the second content received through the screen mirroring is to be displayed is in the vertical format, and thus, the electronic device 100 may transmit, to the peer device executing the second content, the resource request message including a request the peer device to send the second content in the vertical mode. The information indicating the vertical mode may include information indicating the request for mobile version content. The first peer device 210 receiving the resource request message may request second content of the vertical format (e.g., mobile version second content) from the server providing the second content when accessing the second content, and receives and executes the second content. In addition, when the first peer device 210 transmits the executed second content in the vertical format to the electronic device 100 through the screen mirroring, the electronic device 100 may display the second content 1720 of the vertical format with the first content 1710.

The term "module" used herein may include a unit including hardware, software, or firmware, and, for example, may be interchangeably used with the terms "logic," "logical block," "component" or "circuit". The "module" may be an integrally configured component or a minimum unit for performing one or more functions or a part thereof. The "module" may be implemented mechanically or electronically. For example, the "module" may include an application-specific integrated circuit (ASIC) chip, a field-programmable gate array (FPGA), and a programmable-logic device for performing some operations, which are known or will be developed. At least part of a device (for example, modules or functions thereof) or a method (for example, operations) according to embodiments may be implemented by instructions stored in a computer-readable storage media (for example, the memory 110) in the form of a programmable module. When the instruction is executed by a processor (for example, the processor 120), the processor may perform a function corresponding to the instruction.

For example, embodiments may be implemented as software containing one or more instructions that are stored in machine-readable (e.g., computer-readable) storage medium (e.g., internal memory or external memory). A processor may call instructions from a storage medium and is operable in accordance with the called instructions. When the instruction is executed by a processor, the processor may perform the function corresponding to the instruction, either directly or under the control of the processor, using other components. The instructions may contain a code made by a compiler or a code executable by an interpreter. The machine-readable storage medium may be provided in the form of a non-transitory storage medium.

Anon-transitory computer-readable medium refers to a medium that stores data semi-permanently, and is readable by machines, but not a medium that stores data for a short moment such as a register, a cache, and a memory. As examples of a non-transitory computer-readable medium, there may be a compact disc (CD), a digital video disc (DVD), a hard disc, a Blu-ray disc, a universal serial bus (USB), a memory card, a read only memory (ROM) and the like, but this is not limiting.

The computer-readable storage medium may be any available medium that may be accessed by a computer, and includes volatile and non-volatile media and removable and non-removable media. Also, the computer-readable medium may include both a computer storage medium. The computer storage medium may include volatile and non-volatile media and removable and non-removable media that are implemented using any method or technology for storing information, such as computer-readable instructions, a data structure, a program module, or other types of data.

In addition, an embodiment may be implemented as S/W programs including instructions stored in a computer-readable storage medium. A computer is a device capable of fetching instructions stored in a storage medium and operating according to the instructions, and may include the electronic device according to an embodiment. The computer-readable storage medium may be provided in the form of a non-transitory storage medium. Here, the term "non-transitory" simply denotes that the storage medium is a tangible device, and does not include a transitory electrical signal, but this term does not differentiate between where data is semi-permanently stored in the storage medium and where the data is temporarily stored in the storage medium.

Also, the control method according to an embodiment may be provided to be included in a computer program product. The computer program product may be traded between a seller and a buyer as a product.

The computer program product may include an S/W program, or a computer-readable storage medium on which the S/W program is stored. For example, the computer program product may include a product (e.g., a downloadable app) in the form of an S/W program that is electronically distributed through a device manufacturer or an electronic market (e.g., Google Play Store or App Store). For electronic distribution, at least a part of an S/W program may be stored in a storage medium or temporarily generated. In this case, the storage medium may include a server of a manufacturer, a server of an electronic market, or a storage medium of a relay server that temporarily stores an S/W program.

The computer program product may include a storage medium of a server or a storage medium of a device in a system including the server and the device. Alternatively, when there is a third device (e.g., smartphone) communicating with the server or the device, the computer program product may include a storage medium of the third device. Alternatively, the computer program product may include an S/W program itself that is transferred from the server to the device or the third device, or from the third device to the device.

In this case, one of the server, the device, and the third device may execute the computer program product to perform the method according to embodiments. Alternatively, two or more of the server, the device, and the third device may execute the computer program product to implement the method according to embodiments in a distributed manner.

For example, the server (e.g., a cloud server, an AI server, etc.) may execute the computer program product stored in the server, and may control the device communicating with the server to execute the method according to embodiments.

As an example, the third device may execute the computer program product and may control the device communicating with the third device to execute the method according to embodiments. When the third device execute the computer program product, the third device downloads the computer program product from the server and executes the computer program product. Alternatively, the third device may execute the computer program product provided in a preloaded state to perform the method according to embodiments.

In addition, the terms such as " . . . unit", etc. provided herein may be realized by a hardware component such as a processor or a circuit, and/or a software component executed via a hardware component such as a processor.

According to an embodiment, in a case in which resources allowing the electronic device to execute a certain function are insufficient when the certain function is about to be executed in the electronic device, the electronic device may dynamically select a peer device capable of providing resources required by the electronic device among peer devices and allow the peer device to execute the certain function. Then, the electronic device is provided with a function execution result, and thus, even when there are insufficient resources for executing the certain function in the electronic device, the electronic device may execute the function by using peer devices to provide the user with the certain function.

The above is provided for the purpose of illustration, and it would be understood by those skilled in the art that various changes and modifications may be made without changing technical conception and essential features of embodiments. Thus, embodiments set forth herein or shown above are to be interpreted in an illustrative and non-limiting sense. For example, each component described to be of a single type can be implanted in a distributed manner. Likewise, components described to be distributed can be implanted in a combined manner.

While certain embodiments have been particularly shown and described with reference to the drawings, embodiments are provided for the purposes of illustration and it will be understood by one of ordinary skill in the art that various modifications and equivalent other embodiments may be made from the disclosure. Accordingly, the true technical scope of the disclosure is defined by the technical spirit of the appended claims.

What is claimed is:

1. An electronic device comprising:
a display;
a communication interface;
a memory storing one or more instructions; and
a processor which, by executing the one or more instructions, is configured to:
  display a single window screen providing a first content image on the display by processing a first content,
  receive a user input for processing a second content while displaying the first content image on the display by processing the first content,
  identify whether a resource is available for processing the first content and the second content in the electronic device,
  based on the resource for processing the first content and the second content being unavailable in the electronic device, identify a peer device having an available resource to process the second content,
  transmit a request for processing the second content to the peer device,
  receive a second content image which is streamed by mirroring from the peer device, the second content image being displayed on a display of the peer device and corresponding to a result second content which results from processing the second content by the peer device, and
  change the single window screen into a multi-window screen including a first window and a second window, the first window providing the first content image and the second window providing the second content image streamed by mirroring from the peer device,
wherein the processor is further configured to:
based on a request for termination of the first window among the first window and the second window in the multi-window screen, disconnect the mirroring from the peer device, process the second content using a resource of the electronic device which was used for processing the first content, and display the single window screen providing a content image corresponding to the second content processed by the resource of the electronic device.

2. The electronic device of claim 1, wherein the processor is further configured to generate a resource inquiry message including a resource list including one or more resources required to execute a function related to the second content, information about the function, and a transfer method of the result second content being a result of an execution of the function.

3. The electronic device of claim 2, wherein the processor is further configured to receive resource response messages including information with respect to at least one of whether the function is possible to execute, whether it is possible to transfer the result second content based on the transfer method, or a busy state of a plurality of peer devices, respectively.

4. The electronic device of claim 3, wherein the processor is further configured to select the peer device by taking into account the information on the busy state, among the plurality of peer devices that indicated that the function is possible to execute and that the result second content is possible to transfer based on the transfer method.

5. The electronic device of claim 4, wherein the processor is further configured to select another peer device among the plurality of peer devices based on a result of an evaluation of the plurality of peer devices performed regularly or based on an occurrence of a preset event.

6. The electronic device of claim 5, wherein the processor is further configured to select the other peer device based on the result of the evaluation performed based on the occurrence of the preset event including an event of detecting that a performance of the streaming of the result second content received from the peer device is equal to or less than a threshold value, or an event indicating that one window among the first window and the second window is terminated on the multi-window screen.

7. The electronic device of claim 1, wherein the request for processing the second content includes information about an operation to process, information about the second content to be processed, and setting information of the electronic device.

8. The electronic device of claim 1, wherein the processor is further configured to:
based on receiving a user control operation input for controlling the displayed second content image in the second window, transmit a control signal corresponding to the user control operation input to the peer device, and
receive, from the peer device, a result of a control operation performed according to the control signal.

9. The electronic device of claim 1, wherein the processor is further configured to:
based on receiving a user content control command with respect to the displayed second content image through a user interface displayed in the second window, transmit a control signal corresponding to the user content control command to the peer device, and
based on a content control operation performed in the peer device according to the control signal, receive, from the peer device, a result of the content control operation via the mirroring, so that the result of the content control operation is reflected to the second content image.

10. The electronic device of claim 1, wherein the processor is further configured to, based on the request for termination of the first window among the first window and the second window in the multi-window screen, decode the second content and display the single window screen providing the content image corresponding to the decoded second content.

11. A method of operating an electronic device, the method comprising:
displaying a single window screen providing a first content image on a display of the electronic device, by processing a first content,
receiving a user input for processing a second content while displaying the first content image on the display by processing the first content;
identifying whether a resource is available for processing the first content and the second content in the electronic device;
based on the resource for processing the first content and the second content being unavailable in the electronic device, identifying a peer device having an available resource to process the second content;
transmitting a request for processing the second content to the peer device;
receiving a second content image which is streamed by mirroring from the peer device, the second content image being displayed on a display of the peer device and corresponding to a result second content which results from processing the second content by the peer device; and
changing the single window screen into a multi-window screen including a first window and a second window, the first window providing the first content image and the second window providing the second content image streamed by mirroring from the peer device,
wherein the method further comprises:
based on a request for termination of the first window among the first window and the second window in the multi-window screen, disconnecting the mirroring from the peer device, processing the second content using a resource of the electronic device which was used for processing the first content, and displaying the single window screen providing a content image corresponding to the second content processed by the electronic device.

12. The method of claim 11, further comprising:
generating a resource inquiry message including a resource list including one or more resources required to execute a function related to the second content, information about the function, and a transfer method of the result second content being a result of an execution of the function.

13. The method of claim 12, wherein the receiving the resource response messages further comprises:
receiving resource response messages including information with respect to at least one of whether the function is possible to execute, whether it is possible to transfer the result second content based on the transfer method, or a busy state of a plurality of peer devices, respectively.

14. The method of claim 13, wherein the identifying the peer device further comprises:
selecting the peer device by taking into account the information on the busy state, among the plurality of peer devices that indicated that the function is possible to execute and that the result second content is possible to transfer based on the transfer method.

15. The method of claim 14, further comprising:
selecting another peer device among the plurality of peer devices based on a result of an evaluation of the plurality of peer devices performed regularly or based on an occurrence of a preset event.

16. The method of claim 11, wherein the displaying of the single window screen providing the content image corresponding to the second content comprises decoding the second content by the electronic device and displaying the single window screen providing the content image corresponding to the decoded second content.

17. A non-transitory computer-readable recording medium having embodied thereon a program which, when executed by a processor, causes the processor to execute a method of operating an electronic device, the method including:
displaying a single window screen providing a first content image on a display of the electronic device, by processing a first content;
receiving a user input for processing a second content while displaying the first content image on the display by processing the first content;
identifying whether a resource is available for processing the first content and the second content in the electronic device;
based on the resource for processing the first content and the second content being unavailable in the electronic device, identifying a peer device having an available resource to process the second content;
transmitting a request for processing the second content to the peer device;
receiving a second content image which is streamed by mirroring from the peer device, the second content image being displayed on a display of the peer device and corresponding to a result second content which results from processing the second content by the peer device; and
changing the single window screen into a multi-window screen including a first window and a second window, the first window providing the first content image and the second window providing the second content image streamed by mirroring from the peer device,
wherein the method further comprises:
based on a request for termination of the first window among the first window and the second window in the multi-window screen, disconnecting the mirroring from the peer device, processing the second content using a resource of the electronic device which was used for processing the first content, and displaying the single window screen providing a content image corresponding to the second content processed by the resource of the electronic device.

18. The non-transitory computer-readable recording medium of claim 17, wherein the displaying of the single window screen providing the content image corresponding to the second content comprises decoding the second content by the electronic device and displaying the single window screen providing the content image corresponding to the decoded second content.

\* \* \* \* \*